United States Patent [19]
Asaida

[11] Patent Number: 5,103,299
[45] Date of Patent: Apr. 7, 1992

[54] SIGNAL PROCESSING CIRCUIT FOR SOLID STATE IMAGING APPARATUS INCLUDING DIGITAL ENHANCEMENT CIRCUIT

[75] Inventor: Takashi Asaida, Kanagawa, Japan

[73] Assignee: Sony Corporation, Tokyo, Japan

[21] Appl. No.: 592,289

[22] Filed: Oct. 3, 1990

[30] Foreign Application Priority Data

Oct. 4, 1989 [JP] Japan .................. 1-257923
Nov. 21, 1989 [JP] Japan .................. 1-302762

[51] Int. Cl.$^5$ ............................. H04N 9/64
[52] U.S. Cl. ............................ 358/37; 358/41
[58] Field of Search .............. 358/32, 37, 41, 44, 358/162

[56] References Cited
U.S. PATENT DOCUMENTS 4,672,430 6/1987 Asaida .................... 358/37
4,979,024 12/1990 Misawa et al. ............ 358/37

Primary Examiner—James J. Groody
Assistant Examiner—Kim Yen Vu
Attorney, Agent, or Firm—Alvin Sinderbrand; William S. Frommer

[57] ABSTRACT

A signal processing apparatus for a solid-state imaging device in which an imaging output signal from a solid-state image sensor of an imaging section in the imaging device having a spatial offset is digitized and formed into a detail signal utilized for image enhancement by digital signal processing. More specifically, a first delay circuit having at least one delay unit which imposes a dealy time of approximately one horizontal scanning period receives a digitized green color imaging signal having the spatial offset. Signal synthesis is then performed in a first synthesis circuit so as to limit the bandwidth of the green color imaging signal in a perpendicular direction. A second delay circuit having at least one digital delay unit which imposes a delay time of approximately one horizontal scanning period receives one of a digitized red or blue color imaging signal or a combined red and blue digitized color imaging signal. Signal synthesis is then performed by a second synthesis unit so as to limit the bandwidth of the red or blue digitized color imaging signal or the combined red and blue digitized color imaging signal in the perpendicular direction. Equal amounts of selected outputs from the first and second synthesis units are summed together in a summation unit and outputted through a digital filter so as to form the horizontal detail signal.

12 Claims, 20 Drawing Sheets

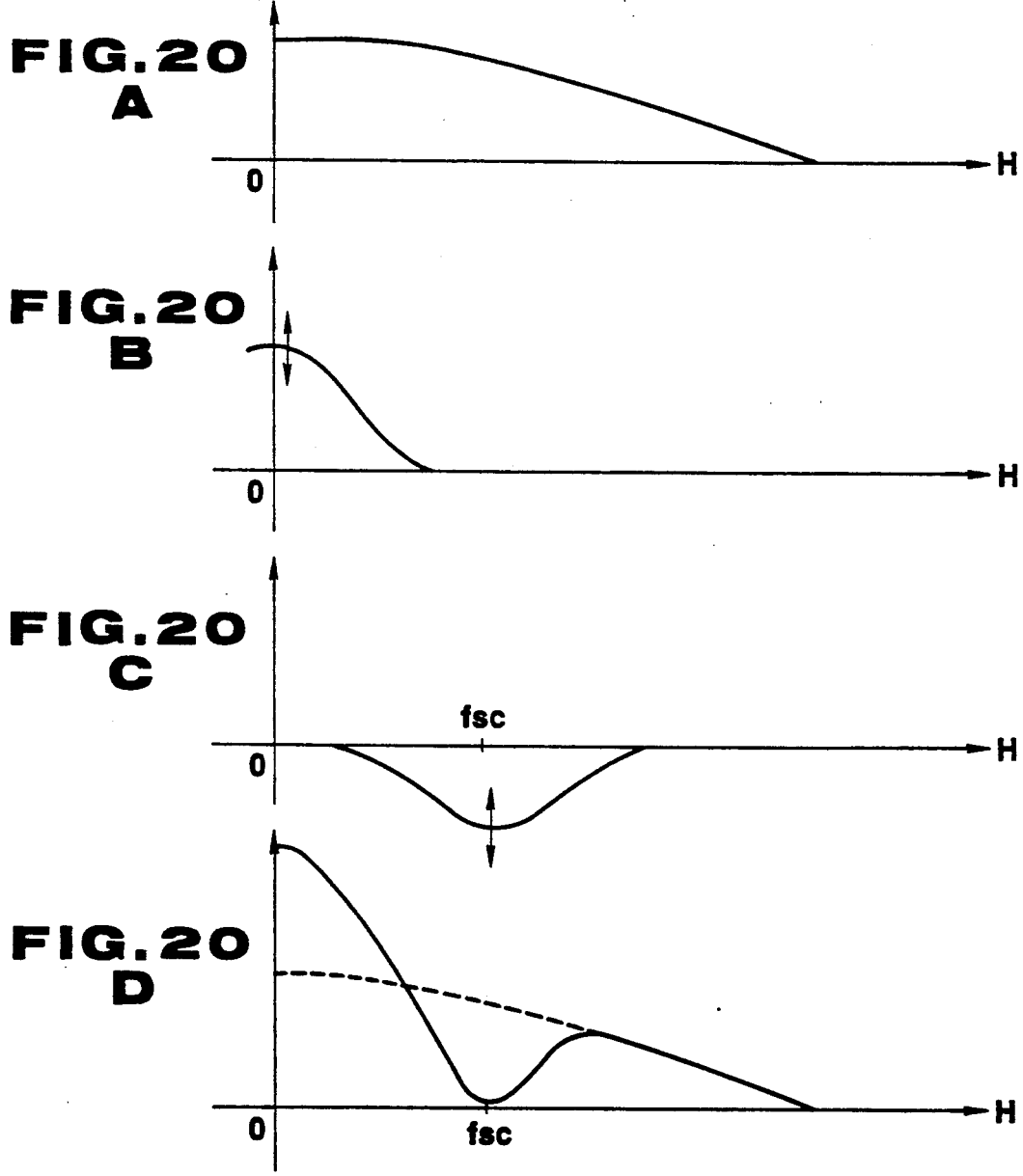

SIGNAL PROCESSING CIRCUIT FOR SOLID STATE IMAGING APPARATUS INCLUDING DIGITAL ENHANCEMENT CIRCUIT

BACKGROUND OF THE INVENTION

1. Field of the Invention

This invention relates to a signal processing circuit for a solid state imaging apparatus in which an imaging output signal from a solid-state image sensor for generating image signals is digitized and a detail signal for performing image enhancement is formed by digital signal processing. More particularly, the present invention relates to a signal processing circuit for a solid state imaging apparatus in which spatial pixel shifting or offsetting is performed by the imaging section, that is, the solid state image sensors for green and red color imaging are arranged with a spatial offset of one half the pixel repetition pitch.

2. Description of the Prior Art

In a solid state imaging apparatus in which the imaging section includes a solid-state image sensor having a discrete pixel structure which is formed by charge coupled devices (CCDs), since the solid state image sensor is a sampling system, aliasing components from the spatial sampling frequency fs are mixed into imaging output signals from the solid state image sensor as, for example, shown by the hatched line in FIG. 1.

Typically, to prevent aliasing components from being mixed into the baseband of the imaging signals, the high frequency side of the baseband components of the imaging signal is suppressed so as to satisfy the Nyquist conditions of the sampling system by the solid state image sensor.

A color television camera may include a multi-CCD type solid-state imaging apparatus, such as a two CCD type imaging apparatus in which a three-color image is formed by a solid-state image sensor having a solid-state image sensor for forming a green color image and a color coding filter for each of the red and blue pixels, or a three CCD type solid-state imaging apparatus in which the three-color image is formed by separate solid-state image sensors.

A technique for improving the resolution in the above mentioned multi-CCD type solid-state image sensor known as pixel shifting of offsetting may be utilized, in which the solid-state image sensors for forming red and blue color images are offset with respect to the solid-state image sensor for forming a green color image by one half the spatial pixel sampling period. The use of the spatial offsetting technique allows high resolution, that is, beyond the limit of the number of pixels in the solid-state image sensor, to be obtained in the analog output of the multi-CCD type solid-state imaging apparatus.

Digital video tape recorders, used in a broadcasting station or the like, may utilize a standard employing the D1/D2 format. As a result, the color television camera is required to provide a digital interface for digital video related equipment which is compatible with such standards. In the standard for the digital interface for digital video related equipment, the sampling rate is set to approximately the sampling rate fs of the presently available solid-state image sensor.

OBJECTS AND SUMMARY OF THE INVENTION

It is an object of the present invention to provide a signal processing circuit for a solid-state image sensor in which a horizontal detail signal is generated and used for optimum image enhancement of the various color image signals while minimizing the risk of cross color interferences.

Another object of the present invention is to provide a signal processing circuit for a solid-state imaging apparatus in which aliasing components contained in generated horizontal detail signals may be eliminated and cross-color interferences may be prevented as a result of the mixing of the horizontal detail signals into the color subcarrier frequency region.

It is a further object of the present invention to provide a solid-state imaging apparatus having an imaging section utilizing the spatial offsetting technique, in which gamma compensation or image enhancement is performed satisfactorily by digital processing of the output imaging signals, without picture quality deterioration due to aliasing components or cross-color interferences.

It is yet a further object of the present invention to provide a signal processing circuit for a solid-state imaging apparatus in which output imaging signals read from a solid-state image sensor at a sampling rate equal to fs are subjected to image enhancement at a clock rate equal to 2 fs.

It is still a further object of the present invention to provide a signal processing circuit for a solid-state imaging apparatus as aforementioned in which digital output signals processed by image enhancement at the clock rate of 2 fs are gamma corrected.

It is a further object of the present invention to provide a signal processing circuit for a solid state imaging apparatus as aforementioned in which digital filters for interpolating and producing the detail signals are selected to have zero points at the frequency equal to fs and to have the same number of odd and even numbers of the zero points.

It is still another object of the present invention to provide a signal processing apparatus as aforementioned for performing optimum image enhancement so as to cope with changes in the imaging environment.

It is yet another object of the present invention to provide a signal processing circuit for a solid state imaging apparatus as aforementioned in which the detail signals formed from the output imaging signal of the imaging section are subjected to a non-linear arithmetic operation in which compression characteristics may be independently set on the positive and negative side levels of a predetermined level.

It is a further object of the present invention to provide a signal processing circuit for a solid-state imaging apparatus as aforementioned in which the detail signals are clipped at a predetermined level by a non-linear arithmetic operation.

It is a further object of the present invention to provide a signal processing circuit for a solid-state imaging apparatus as aforementioned in which a broad range detail signal free from aliasing components is produced for the output imaging signal.

It is yet another object of the present invention to provide a signal processing circuit for a solid-state imaging apparatus as aforementioned in which the vertical detail signal is band-limited in the horizontal direction to prevent the vertical detail signal component from being mixed into the region of the color subcarrier frequency.

According to an aspect of the present invention, a signal processing apparatus for a solid-state color video camera having first, second and third solid-state image sensors for red-color, green-color and blue-color images, respectively, having equal pixel pitches, the solid state image sensor the green color image being arrayed with a spatial shift of one half the pixel pitch with respect to the solid-state image sensors for the red-color and the blue-color images, the signal processing apparatus comprising:

means for deriving output signals from the first, second and third image sensors in accordance with the red-color, green-color and blue-color images, respectively, analog-to-digital converting means for digitizing the output signals derived from the first, second and third solid-state image sensors at a predetermined sampling rate and thereby providing digitized red, green and blue signals, first delay means having at least one digital delay circuit with a delay time of a horizontal period and supplied with the digitized green signal, the first delay means generating a plurality of relatively delayed output signals, second delay means having at least one digital delay circuit with a delay time of the horizontal period and supplied with at least one of the digitized red and blue signals, the second delay means generating a plurality of relatively delayed output signals, first synthesizing means for synthesizing the plurality of output signals from the first delay means so as to provide an output from the first synthesizing means having a limited bandwidth in the vertical direction, second synthesizing means for synthesizing the plurality of output signals from the second delay means so as to provide an output from the second synthesizing means having a limited bandwidth in the vertical direction, summation means for equally adding the outputs of the first and second synthesizing means so as to provide a summed output, and digital filter means supplied with the summed output of the summation means for generating a horizontal detail signal therefrom.

The above, and other objects, features and advantages of the present invention, will be apparent in the following detailed description of a preferred embodiment of the present invention when read in conjunction with the accompanying drawings in which corresponding parts are identified by the same reference numerals.

BRIEF DESCRIPTION OF THE DRAWINGS

FIG. I is a diagrammatic view showing the signal spectrum of an output imaging signal from a conventional solid-state image sensor having a discrete pixel arrangement;

FIGS. 20A, 20B, 20C and 20D are graphs used for explaining the band-limiting operation of the second digital filter circuit shown in FIG. !8;

DESCRIPTION OF THE PREFERRED EMBODIMENTS

A signal processing circuit for a solid-state imaging apparatus according to an embodiment of the present invention will now be explained in detail with reference to the drawings.

Figure 2:
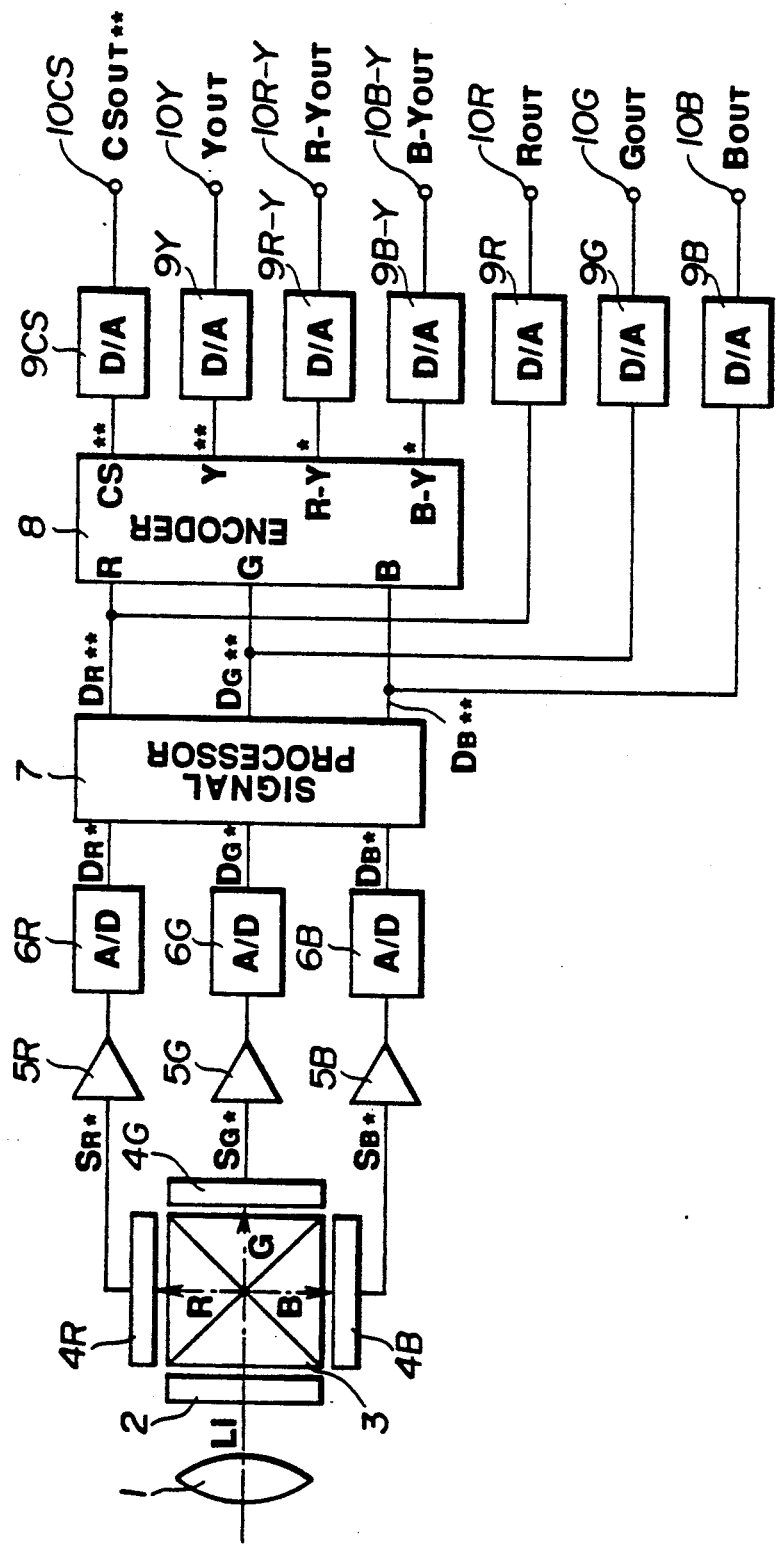
FIG. 2 is a block diagram of a three CCD type color television camera to which the present invention is applied.

FIG. 2 shows a color television camera having a three CCD solid-state imaging device in which the present invention is applied. As shown therein, an imaging light $L_i$ incident from an imaging lens 1 is supplied through an optical low-pass filter 2 to a color separating filter 3, whereupon the light is separated into three prime color light components, that is, red (R), green (G) and blue (B) color light components, and respectively supplied to three CCD image sensors 4R, 4G and 4B.

The three CCD image sensors 4R, 4G and 4B of the imaging section of the color television camera are arranged to have a spatial pixel offsetting in that the CCD image sensor 4R for forming the red color image and the CCD image sensor 4B for forming the blue color image are offset by one half the spatial sampling period $\tau s$ with respect to the CCD image sensor 4G for forming the green color image. The three CCD image sensors 4R, 4G and 4B are driven by CCD driving circuits (not shown). As a result, the imaging charges of the pixels are read out by read-out clocks which have a sampling frequency fs equal to four times the color sub-carrier frequency fsc, or 4 fsc.

Figure 1:
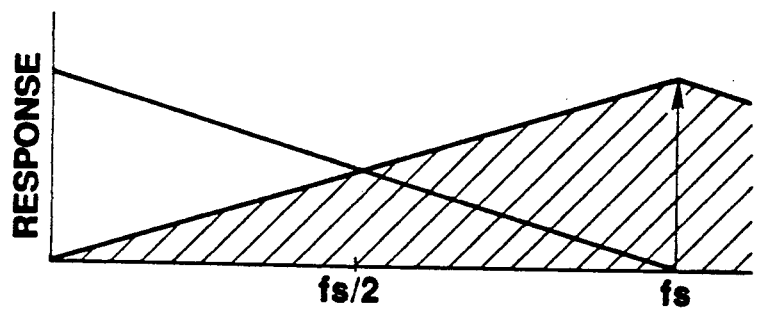
Figure 3:
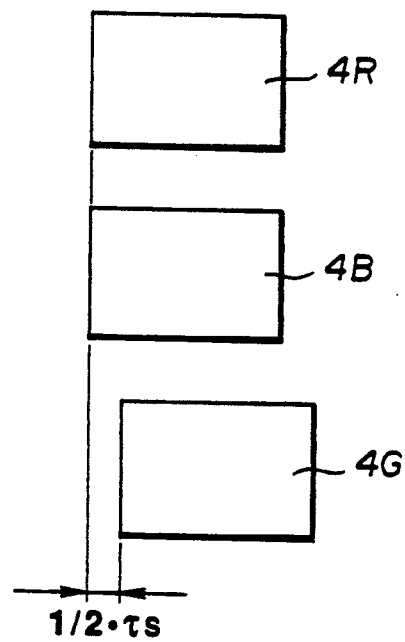
FIG. 3 is a diagrammatic view showing states of the CCD image sensors of the color television camera shown in FIG. 2.
Figure 4:
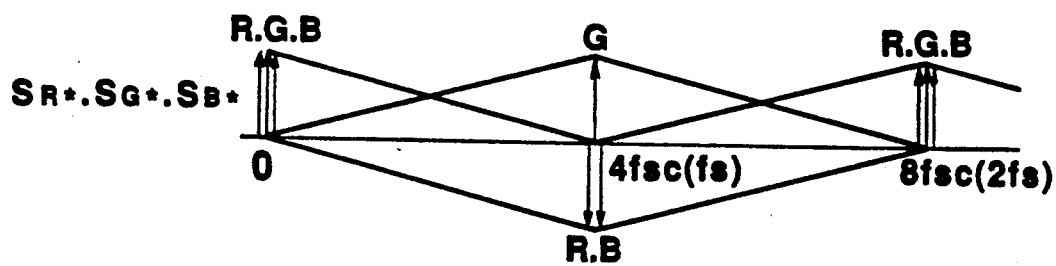
FIG. 4 shows the signal spectrum for each output imaging signal from the associated CCD image sensor of the color television camera shown in FIG. 2.

Thus, the CCD image sensor 4G for green color image and the CCD image sensors 4R and 4B for respectively forming the red and blue color images perform spatial sampling of the three color object images at positions which are offset by $\tau s/2$ from each other. As a result, the imaging output signals $S_{R*}$, $S_{G*}$ and $S_{B*}$ are respectively read out from the CCD image sensors 4R, 4G and 4B in such a manner that the sampled green imaging output signal $S_{G*}$ of the CCD image sensor 4G is out-of-phase with respect to the sampled red color image output signal $S_{R*}$ and the blue color image output signal $S_{B*}$ of the CCD image sensors 4R and 4B, respectively, as shown by the signal spectral components of FIG. 4.

The imaging output signals $S_{R*}$, $S_{G*}$ and $S_{B*}$, read out from the CCD image sensors 4R, 4G and 4B by read-out clocks having the sampling frequency fs or 4 fsc, are respectively supplied through buffer amplifiers 5R, 5G and 5B to analog-to-digital converters (A/D converters) 6R, 6G and 6B.

A/D converters 6R, 6G and 6B are supplied with clock signals (not shown) having a clock rate fs or 4 fsc, which is equal to the sampling of the image output signals $S_{R*}$, $S_{G*}$ and $S_{B*}$. The A/D converters 6R, 6G and 6B respectively digitize the imaging output signals $S_{R*}$, $S_{G*}$ and $S_{B*}$ at the clock rate fs or 4 fsc to form color data $D_{R*}$, $D_{G*}$ and $D_{B*}$ which, in turn, have output spectrums similar to the spectrums of the imaging output signals $S_{R*}$, $S_{G*}$ and $S_{B*}$ shown in FIG. 4. The color data $D_{R*}$, $D_{G*}$ and $D_{B*}$ are transmitted to a signal processor 7.

Figure 5:
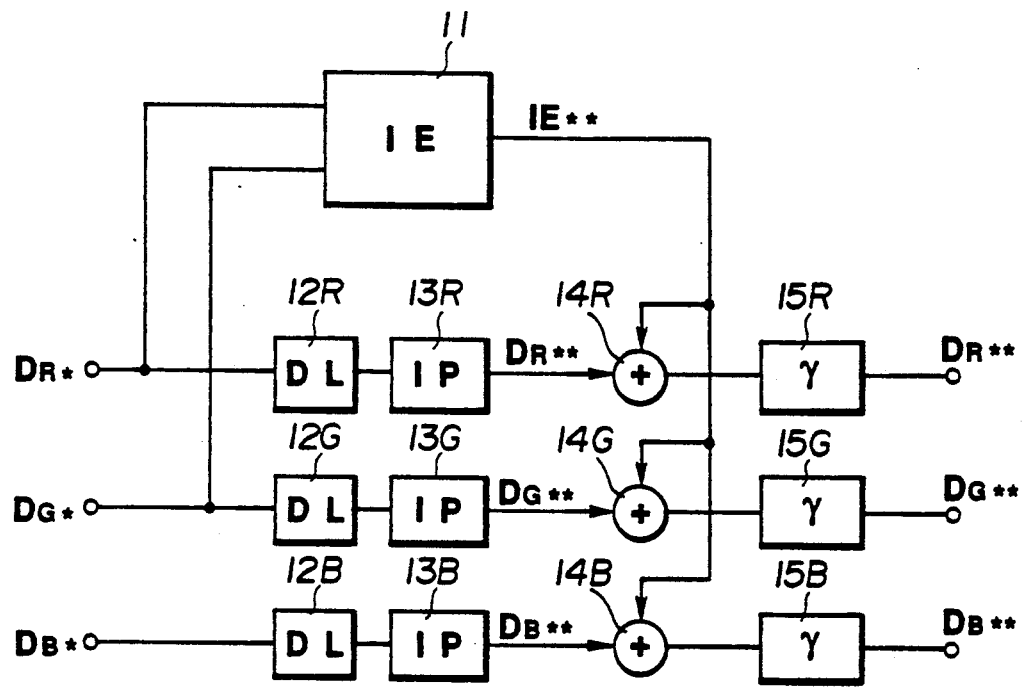
FIG. 5 is a block diagram showing a signal processing section of the color television camera shown in FIG. 2 according to an embodiment of the present invention.

The signal processor 7, as shown in FIG. 5, includes a detail signal generator 11 which is supplied with the red color data $D_{R*}$ from the A/D converter 6R and the green color data $D_{G*}$ from the A/D converter 6G, interpolators 13R, 13G and 13B which are respectively supplied with the three color data $D_{R*}$, $D_{G*}$ and $D_{B*}$ from the A/D converters 6R, 6G and 6B via delay circuits 12R, 12G and 12B, summing points or circuits 14R, 14G and 14B which are respectively supplied with the interpolated three color data $D_{R}$, $D_{G}$ and $D_{B}$ from the interpolators 13R, 13G and 13B and with a detail signal $D_{IE}$ from detail signal generator II, and gamma correction circuits 15R, 15G and 15B which are supplied with a respective summation output from the summation points 14R, 14G and 14B.

The interpolators 13R, 13G and 13B of the signal processor 7 respectively interpolate the three color data $D_{R*}$, $D_{G*}$ and $D_{B*}$ at a clock rate equal to twice the clock rate fs or 8 fsc to form the three color data $D_{R}$, $D_{G}$ and $D_{B**}$, which are respectively supplied to the summing points 14R, 14G and 14B.

The digital signal generator 11, as hereinafter described, includes summing means for summing equal amounts of the green color data $D_{G*}$ sampled at the fs rate from the A/D converter 6G and the red color data $D_{R*}$ sampled at the fs rate from the A/D converter 6R after multiplexing at the clock rate 2 fs and a digital filter for differentiating an addition or summation output of the summing means. The detail signal generator 11 transmits the detail signal $D_{IE**}$ which contains the differential output of the digital filter, to the summing points 14R, 14G and 14B.

These summing points 14R, 14G and 14B sum the detail signal $D_{IE}$ from the detail signal generator 11 to respective ones of the three color data $D_{R}$, $D_{G}$ and $D_{B}$ from the interpolators 13R, 13G and 13B to obtain an image enhancement of the three color data $D_{R}$, $D_{G}$ and $D_{B}$. The image enhanced three color data $D_{R}$, $D_{G}$ and $D_{B}$ are supplied to the gamma correction circuits 15R, 15G and 15B, respectively.

The gamma correction circuits 15R, 15G and 15B respectively perform gamma correction on the image enhanced three color data $D_{R}$, $D_{G}$ and $D_{B}$ at a clock rate of 2 fs and output gamma corrected color data $D_{R}$, $D_{G}$ and $D_{B}$ at the 2 fs rate.

The color television camera which has an imaging section constructed in accordance with the spatial offsetting technique, suffers from cross color interference due to aliasing components contained in the imaging output or mixing of the detail signal into the color subcarrier frequency region. On the other hand, with the horizontal detail signal IEH having the 2 fs rate which is formed as described above, that is, by summing equal amounts of the green color data $D_{G*}$ of the fs rate from the A/D converter 6G and the red color data $D_R$ of the fs rate from the A/D converter 6R after multiplexing at the clock rate 2 fs and differentiating the summation output, first order carrier components are canceled by the equal amount summation. Thus, a broad range horizontal detail signal IEH, which is free of aliasing distortion, may be generated in the detail signal generator 11. Further, the summing circuits 14R, 14G and 14B respectively sum the detail signal $D_{IE}$, which contains the 2 fs rate horizontal detail signal IEH, from the detail signal generator 11 to the 2 fs rate three color data $D_{R}$, $D_{G}$ and $D_{B}$ from the interpolator 13R, 13G and 13B thereby obtaining high resolution image enhancement of the three color data $D_{R}$, $D_{G}$ and $D_{B**}$ which, in turn, are gamma corrected by circuits 15R, 15G and 15B, as previously described. Alternatively, the detail signal generator 11 may sum equal amounts of the green color imaging signals and red color imaging signals or sum equal amounts of a combined signal of the red and blue color image signals and the green color image signal, whereby the first order carrier components are cancelled so as to form the broad range horizontal detail signal which is free from aliasing distortions.

Figure 6:
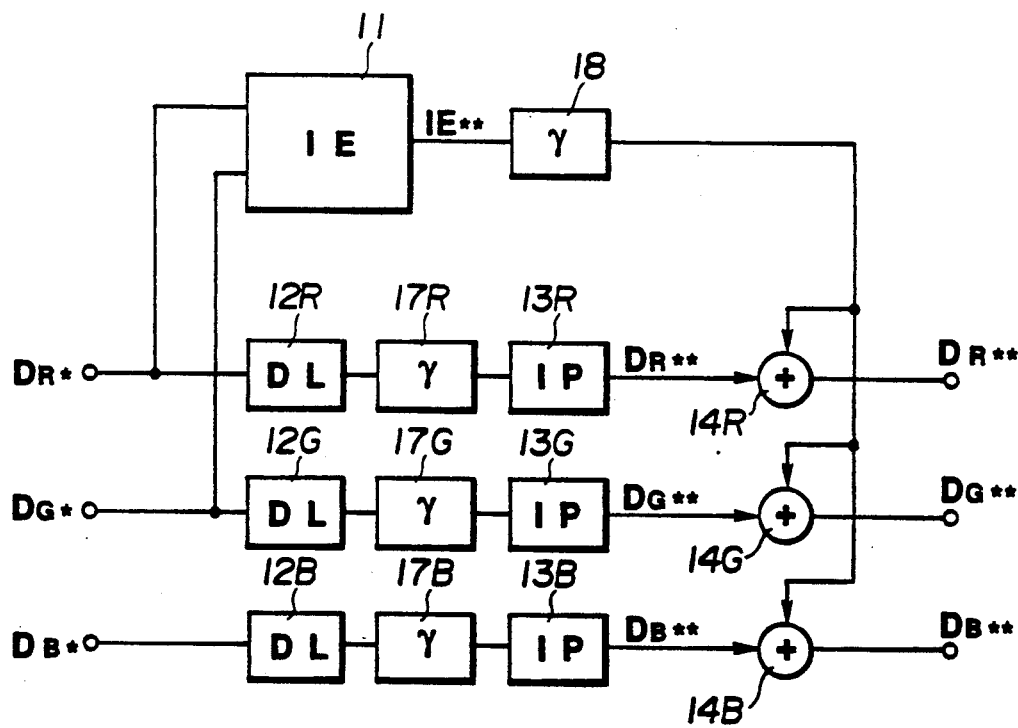
FIG. 6 is a block diagram of the signal processing section of the color television camera shown in FIG. 2 according to a second embodiment of the present invention.

In an alternate embodiment, the signal processor 7 may be constructed as shown in FIG. 6, that is, with first gamma correction circuits 17R, 17G and 17B operating at the clock rate fs and located upstream of the interpolators 13R, 13G and 13B, respectively, and a second gamma correction circuit 18 operating at a clock rate 2 fs and located downstream of the detail signal generator 11.

The first gamma correction circuits 17R, 17G and 17B gamma correct the fs-rate three-color data $D_{R^*}$, $D_{G^*}$ and $D_{B^*}$, respectively, at a clock rate of fs. The gamma corrected three-color data $D_{R^*}$, $D_{G^*}$ and $D_{B^*}$ are respectively supplied to the interpolators 13R, 13G and 13B which, in turn, respectively, interpolate the gamma-corrected three-color data $D_{R^*}$, $D_{G^*}$ and $D_{B^*}$ to form the 2 fs rate three color data $D_{R^{}}$, $D_{G^{}}$ and $D_{B^{}}$, which are supplied to the summation circuits 14R, 14G and 14B, respectively. The second gamma correction circuit 18 gamma corrects the 2 fs rate detail signal $D_{IE^{}}$, supplied from the detail signal generator 11, at a clock rate of 2 fs and supplies the gamma corrected detail signal $D_{IE^{}}$ to the summation circuits 14R, 14G and 14B. The summing circuits 14R, 14G and 14B respectively sum the gamma corrected 2 fs rate detail signal $D_{IE^{}}$ to the gamma corrected 2 fs rate three color signals $D_{R^{}}$, $D_{G^{}}$ and $D_{B^{**}}$ supplied from interpolators 13R, 13G and 13B, respectively, so as to perform an image enhancement operation.

Figure 7:
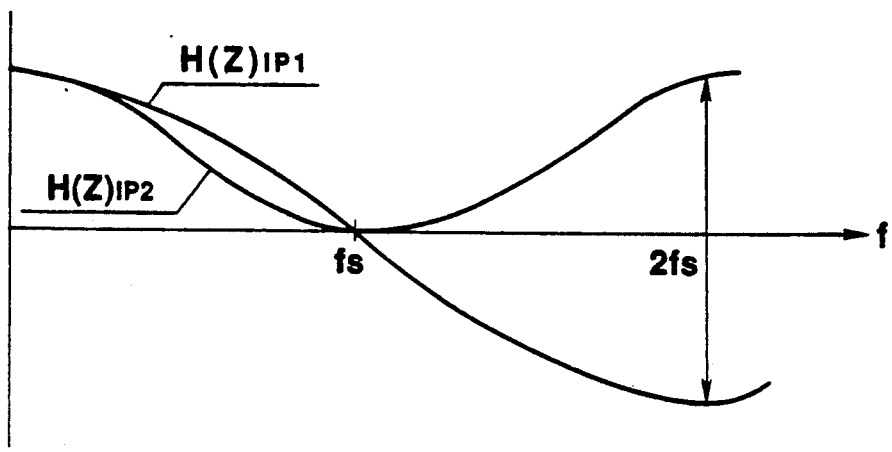
FIG. 7 is a graph showing filtering characteristics of a digital filter provided in an interpolator of the signal processing section.
Figure 8:
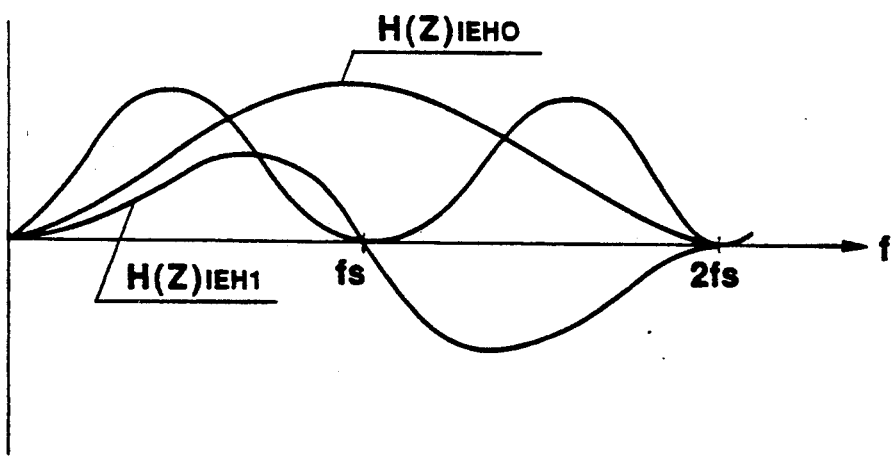
FIG. 8 is a graph showing filtering characteristics of a digital filter in a detail signal generator of the signal processing section.

Each of the interpolators 13R, 13G and 13B includes a digital filter which operates at a clock rate of 2 fs or 8 fsc on the fs-rate three-color data $D_{R^*}$, $D_{G^*}$ and $D_{B^*}$, respectively and has filter characteristics $H(z)_{IPM}$ as defined by the following equation:

$$H(z)_{IPM} = (z^{-1} + 1)^m \quad (1)$$

and as shown in FIG. 7. As shown therein, the filter characteristics have at least one zero point Z being a unit delay of the 2 fs rate. The digital filter in detail signal generator 11, as previously mentioned, differentiates the sum output from the summation means. This filter processing is performed, by supplying the summed output through the digital filter which has filter characteristics $H(z)_{IEHn}$ as, for example, shown in FIG. 8 as shown thereon, these filter characteristics have at least one point at fs and the same number of orders n as to evenness or oddness as the number of orders m of the digital filters of the interpolators 13R, 13G and 13B.

Figure 9:
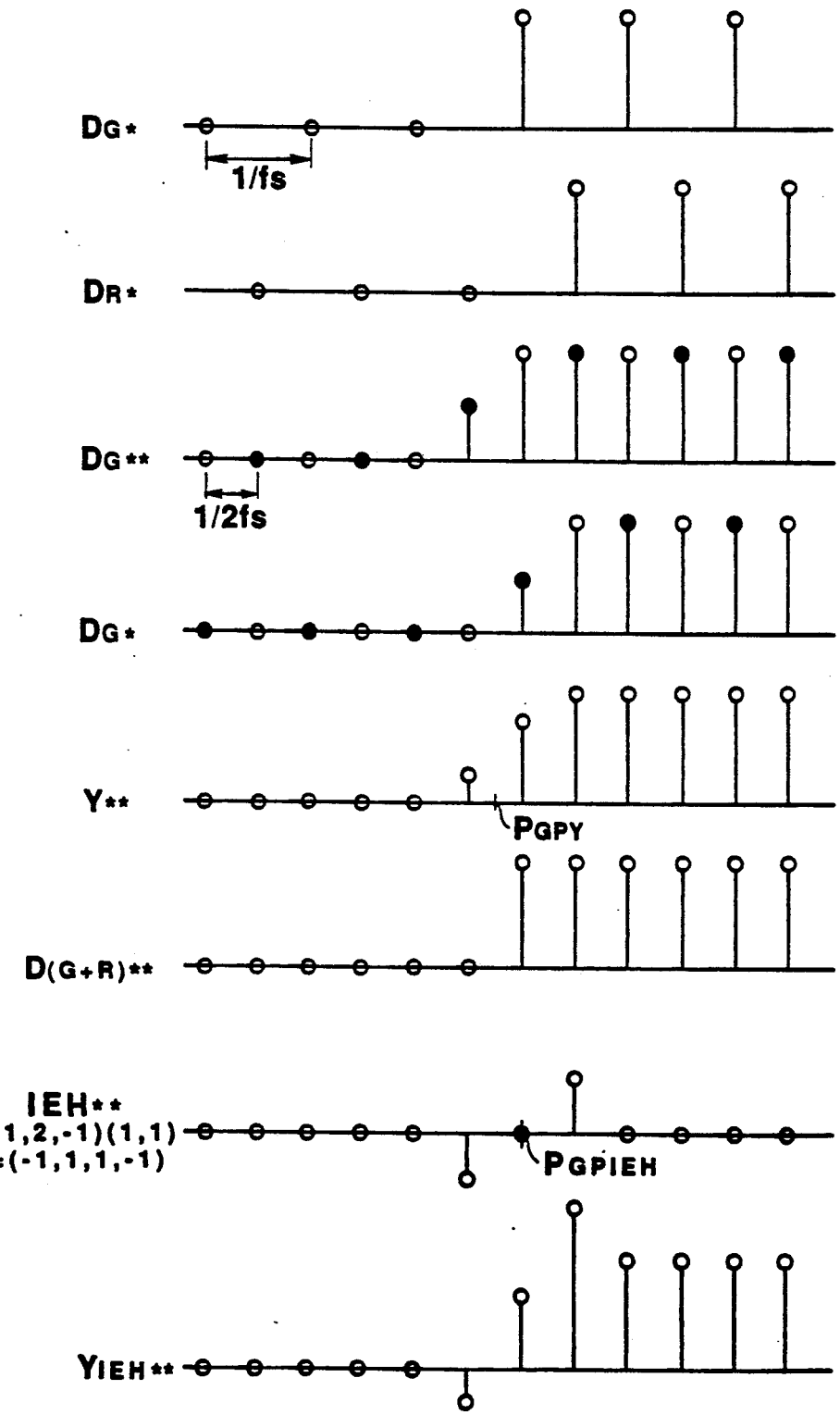
FIG. 9 is a chart used for explaining the horizontal contour enhancement operation for the case in which an even number order interpolation is performed in the interpolating section and an odd number order differentiating operation is performed in the detail signal generator.

If the numbers of orders n and m of the digital filters of the detail signal generator 11 and the interpolating sections 13R, 13G and 13B, respectively, are not substantially identical as to evenness and oddness, the group delay caused by the digital filters in the interpolators 13R, 13G and 13B is deviated with respect to the group delay caused by the differentiating digital filter in the detail signal generator 11. As a result, satisfactory image enhancement may not be achieved even upon addition of the detail signal to the interpolated signal. Consider the case in which an even number order, for example, an interpolation is performed at the signal interpolators 13R, 13G and 13B and an odd number order, for example, a first order, differentiation is performed at the detail signal generator 11. In this case, the center of the group delay of the luminance data $Y^{}$, obtained by summing 2 fs rate green color data $D_{G^{}}$ to red color data $D_{R^{}}$ which, in turn, are obtained be second order data $D_{R^{}}$, respectively, and having a phase difference of $1/(2 fs)$ as shown in FIG. 9, is at the position $P_{GPY}$ in FIG. 9. On the other hand, the center of the group delay of the horizontal detail signal $IEH^{}$ obtained by first order differentiation of the 2 fs rate signal $D_{(G+R)^{}}$, which is obtained by addition of equal amounts of the fs rate green color data $D_{G^*}$ and red-color data $D_{R^*}$ after multiplexing at the 2 fs clock rate, is at a position $P_{GPIEM}$ shown in FIG. 9, which is offset by $1/(4 fs)$ with respect to the center of the group delay $P_{GPY}$ of the luminance data $Y^{}$. As a result, the waveform of the horizontal contour compensated luminance data $Y_{IEH^{}}$, obtained by combining the luminance data $Y^{}$ with the horizontal detail signal $IEH^{}$, is not point-to-point symmetrical.

However, with the present signal processing apparatus the respective orders of the digital filters of the detail signal generator 11 and the interpolators 13R, 13G and 13B are substantially identical as to evenness and oddness. As a result, the group delay caused by the interpolating digital filters coincides with the group delay caused by the differentiating digital filter, so that satisfactory image enhancement may be achieved by addition of the detail signal to the respective interpolated signals. To further illustrate this matter, consider the following situations.

Figure 10:
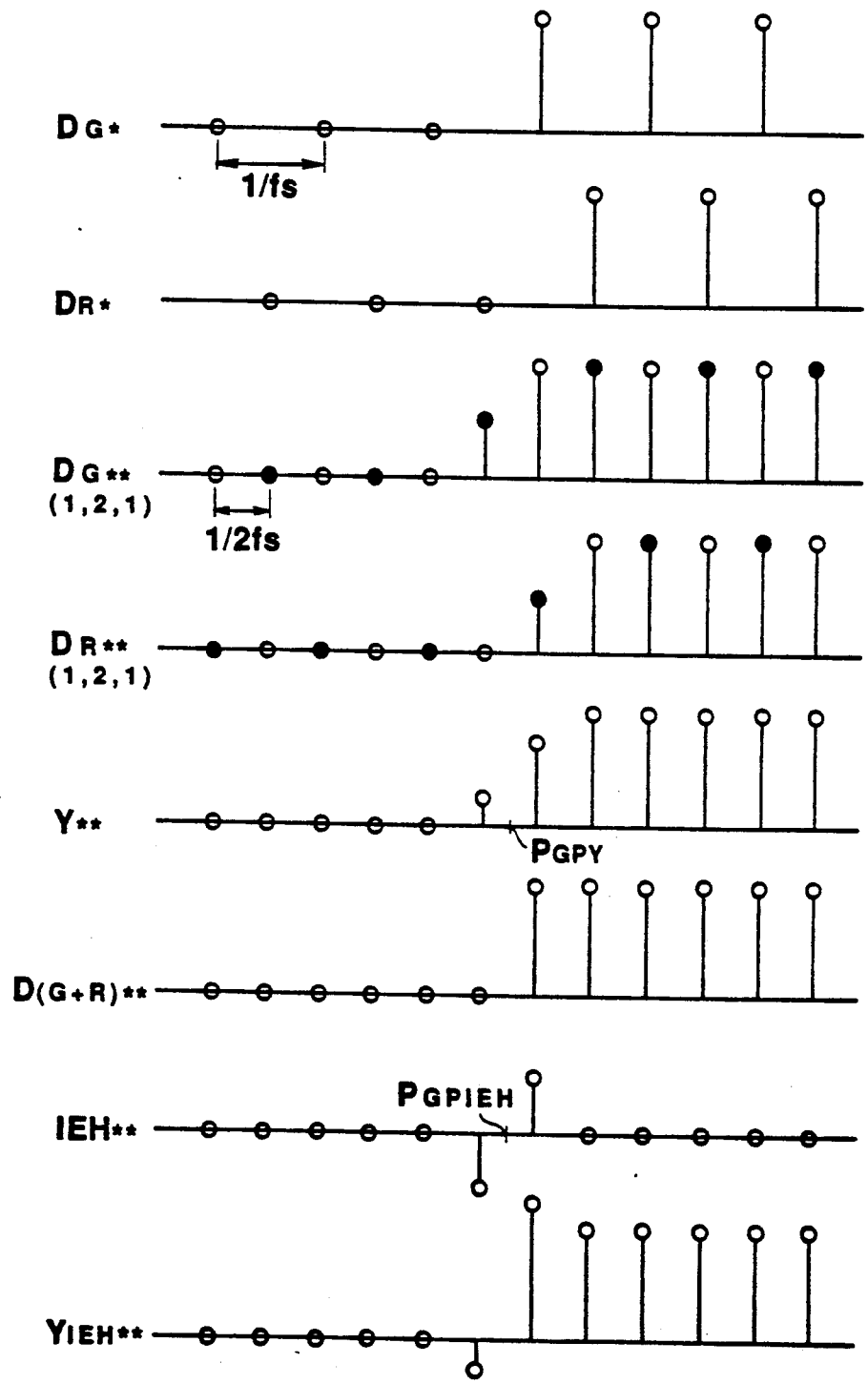
FIG. 10 is a chart used for explaining the horizontal contour enhancement operation for the case in which an even number order interpolation is performed in the interpolator and an even number order differentiating operation is performed in the detail signal generator.

In the first situation, an even number order, for example, a second order, interpolation is performed at the interpolators 13R, 13G and 13B, and an even number order, for example, a zeroth order, differentiation is performed at the detail signal generator 11. In this situation, the center of the group delay of the luminance data $Y^{}$, obtained upon summation of the 2 fs rate green color data $D_{G^{}}$ and red color data $D_{R^{**}}$ which, in turn, are obtained by interpolating fs rate green and red color data $D_{G^*}$ and $D_{R^*}$ and having a phase difference of $1/(2 fs)$ as shown in FIG. 10, is at a position $P_{GPY}$ in FIG. 10. On the other hand, the center of the group delay of the horizontal detail signal $IEH^{}$ obtained by zeroth order differentiation of the 2 fs clock rate signal $D_{(G+R)^{}}$, which is obtained upon addition of equal amounts of the fs rate green and red color data $D_{G^*}$ and $D_{R^*}$, respectively, after multiplexing at the clock rate 2 fs, is at a position $P_{GPIEM}$ as shown in FIG. 10 which coincides with the center $P_{GPY}$ of the group delay of the luminance data $Y^{}$. As a result, the waveform of the horizontal contour compensated luminance data $Y_{IEH^{}}$, obtained by combining the luminance data $Y^{}$ with the horizontal detail signal $IEH^{}$, is point-to-point symmetrical with respect to the phase of the center of the group delay.

Figure 11:
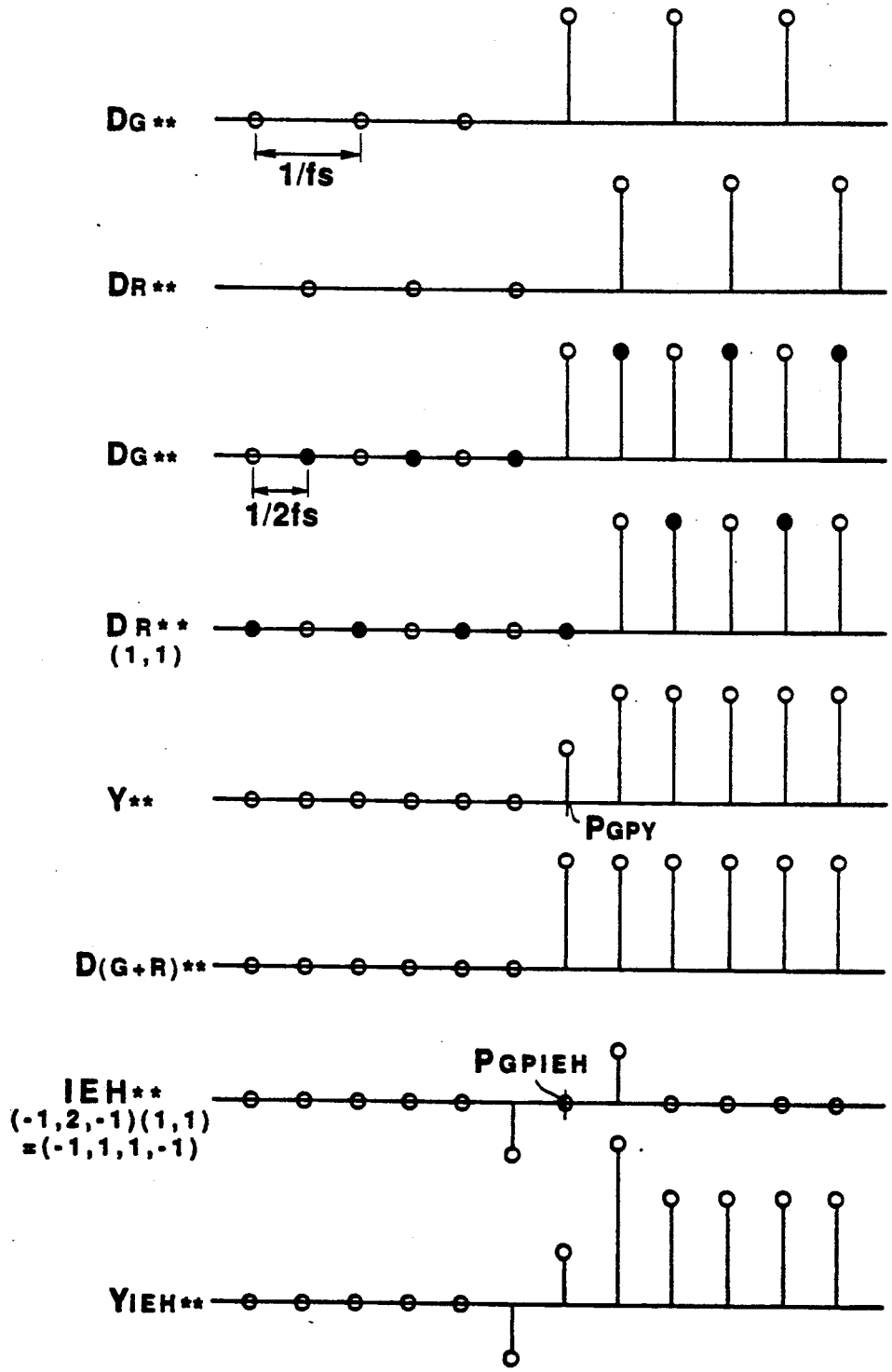
FIG. 11 is a chart used for explaining the horizontal contour enhancement operation for the case in which the even number order interpolation is performed in the interpolator and an odd number order differentiating operation is performed in the detail signal generator.

In the second situation, an odd number order, for example, a first order, interpolation is performed at the interpolators 13R, 13G and 13B and an odd number order, for example, a first order, differentiation is performed at the detail signal generator 11. In this situation, the center of the group delay of the luminance data $Y^{}$, obtained by adding the 2 fs rate green and red color data $D_{G^{}}$ and $D_{R^{**}}$, respectively, which in turn, are obtained by first order interpolation of the fs rate green and red color data $D_{G^*}$ and $D_{R^{}}$, respectively, and having a phase difference of $1/(2 fs)$ relative to each other, as shown in FIG. 11, is at the position $P_{GPY}$ shown in FIG. 11. On the other hand, the center of the group delay of the horizontal detail signal IEH obtained by first order differentiation of the 2 fs rate signal $D_{(G+R)**}$ which, in turn, is obtained by summing equal amounts of the fs rate green and red color data $D_{G*}$ and $D_{R*}$, respectively, after multiplexing at the clock rate of 2 fs, is at a position $P_{GPIEH}$ as shown in FIG. 11 which coincides with the center of group delay $P_{GPY}$ of the luminance data Y. Thus, the horizontal contour compensated luminance data $Y_{IEH}$, obtained upon summation of the luminance data Y to the horizontal detail signal IEH, has a waveform which is point-to-point symmetrical with respect to the phase of the center of the above mentioned group delay.

Figure 12:
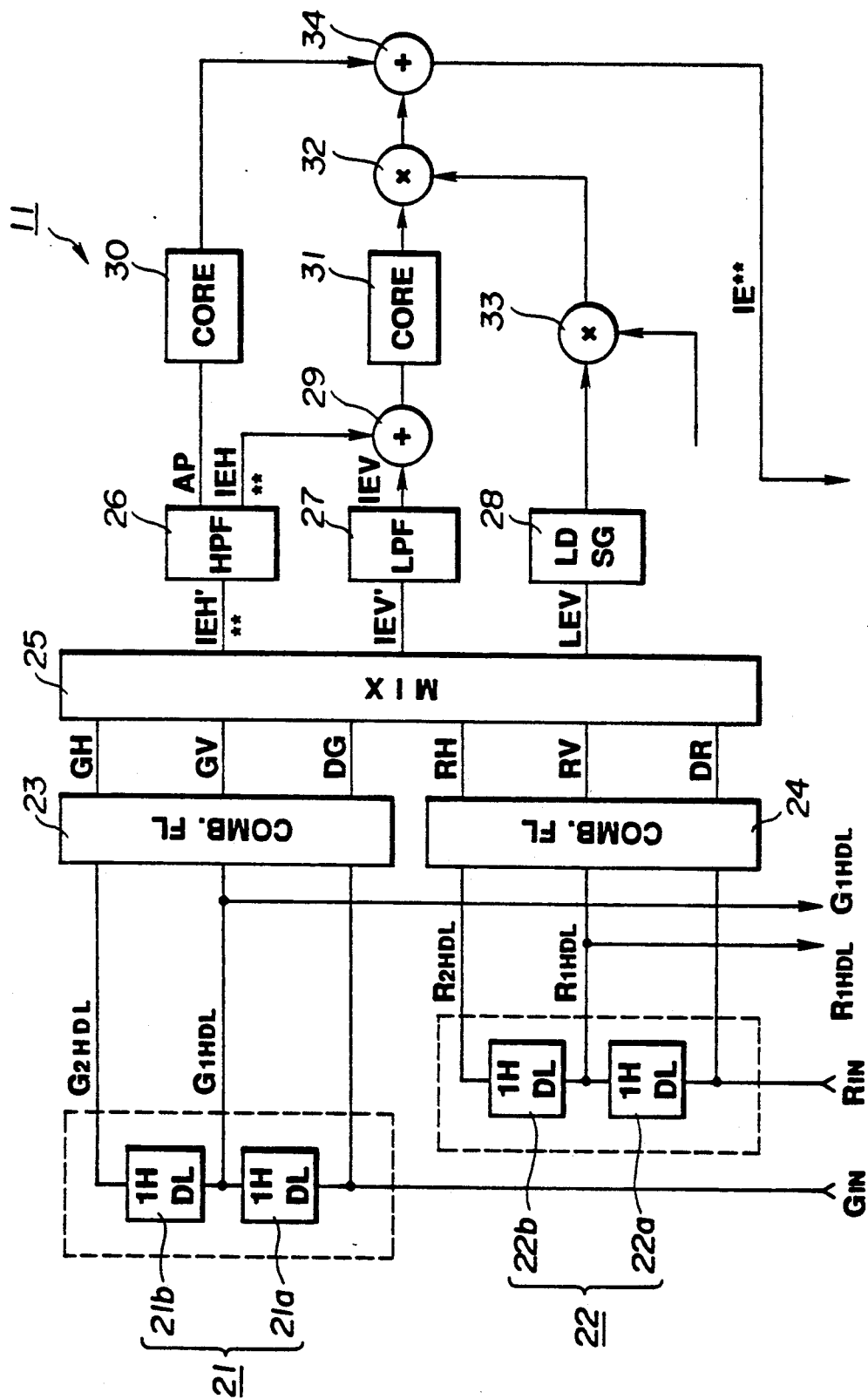
FIG. 12 is a block diagram showing a detail signal generator of the signal processing section according to an embodiment of the present invention.

FIG. 12 illustrates a preferred construction of the detail signal generator. As shown therein, the generator 11 includes a first delay circuit 21 which receives the green color data $D_{G*}$ as input data $G_{IN}$ from the A/D converter 6G, and a second delay circuit 22 which receives the red color data $D_{R*}$ as input data $R_{IN}$ from A/D converter 6R.

The first delay circuit 21 includes a series connection of two 1H delay circuits 21a and 21b, in which each delay circuit provides a delay time equal to one horizontal scanning period 1H to the input signal and may, for example, be a digital delay means such as a D-type flipflop or a memory. First delay circuit 21 transmits a OH delay output $G_{IN}$, a 1H delay output $G_{1HDL}$ and a 2H delay output $G_{2HDL}$ of the green color input data $G_{IN}$ from the A/D converter 6G to a first comb filter 23. First delay circuit 21 further supplies the 1H delay output $G_{1HDL}$ to the interpolator 13G by way of the delay circuit 12G of FIG. 5.

Similarly, the second delay circuit 22 includes a series connection of two 1H delay circuits 22a and 22b, in which each delay circuit provides a delay time equal to one horizontal scanning period 1H to the input signal and may, for example, be a digital delay means such as a D-type flipflop or memory. This second delay circuit 22 transmits a OH delay output $R_{IN}$, a 1H delay output $R_{1HDL}$ and a 2H delay output $R_{2HDL}$ of the red color input data $R_{IN}$ from A/D converter 6R to a comb filter 24, and further supplies the 1H delay output to the interpolator 13R by way of the delay circuit 12R of FIG. 5.

The first comb filter 23, which receives the green input data, from the first delay circuit 21, as previously described, provides filter outputs GH, GV and DG which may be expressed as follows:

$$GH = \frac{\omega^{-1}}{4} \{2 + (\omega^{-1} + \omega) \cdot G_{IN}\} \quad (3)$$

$$GV = \frac{\omega^{-1}}{4} \{2 - (\omega^{-1} + \omega) \cdot G_{IN}\} \quad (4)$$

$$DG = \omega^{-1} \cdot GIN \quad (5)$$

to a mixer 25 on the basis of the above mentioned three outputs $G_{In}$, $G_{1NDL}$ and $G_{2HDL}$.

The second comb filter 24, when receives the red color input data from the second delay circuit 22, as previously described, provides filter outputs RH, RV and DR which may be expressed as follows:

$$RH = \frac{\omega^{-1}}{4} \{2 + (\omega^{-1} + \omega) \cdot RIN\} \quad (6)$$

$$DR = \omega^{-1} \cdot RIN \quad (7)$$

$$RV = \frac{\omega^{-1}}{4} \{2 - (\omega^{-1} + \omega) \cdot RIN\} \quad (8)$$

to the mixer 25 on the basis of the above mentioned three outputs $R_{IN}$, $R_{1HDL}$ and $R_{2HDL}$ from the second delay circuit 22.

The mixer 25, which receives the filter outputs GH, GV and DG from the first comb filter 23 and the filter outputs RH, RV and DR from the second comb filter 24 as previously described, outputs signals IEH', IEV' and LEV which may be expressed as follows:

$$IEH' = GH + RH \quad (12)$$

$$IEV' = GV + \alpha \cdot RV \quad (\alpha = 0, \tfrac{1}{3}, \tfrac{1}{2}, 1) \quad (13)$$

$$LEV = GH + \beta \cdot RH \quad (14)$$

The IEH' signal from the mixer 25 is obtained by summing equal amounts of the filter output GH from the first comb filter 23 and the filter output RH from the second filter 24 after multiplexing at the clock rate of 2 fs. The IEH' signal is supplied from mixer 25 to a first digital filter circuit 26 as a 2 fs rate horizontal detail signal.

By applying the above described processing to the previously described color television camera, in which the imaging section is constructed utilizing the spatial offsetting principle, the first order carrier components are canceled and a broad range horizontal detail signal IEH' free of aliasing distortions may be generated.

The above mentioned signal IEV' is obtained by summing the filter output GV from the first comb filter 23 and the filter output RV from the second comb filter 24 together with a ratio of 1:α, as expressed in equation 13, at mixer 25. This summed signal IEV' is supplied as the vertical detail signal to a second digital circuit 27.

The above mentioned output signal LEV is obtained by summing the filter output GH from the first comb filter 23 and the filter output RH from the second comb filter 24 together with a ratio of 1:β, as expressed in equation 14, at mixer 25. Alternatively, output DG from filter 23 and output DR from filter 24 may be substituted for outputs GH and RH, respectively, in the above summation. The summed signal LEV is supplied as the level signal to a level dependent signal generator 28.

The above mentioned first digital filter circuit 26, which in a preferred embodiment has bypass filtering characteristics having at least two or more even number zero points at fs, generates 2 fs rate horizontal detail signals as hereinafter described.

Figure 13:
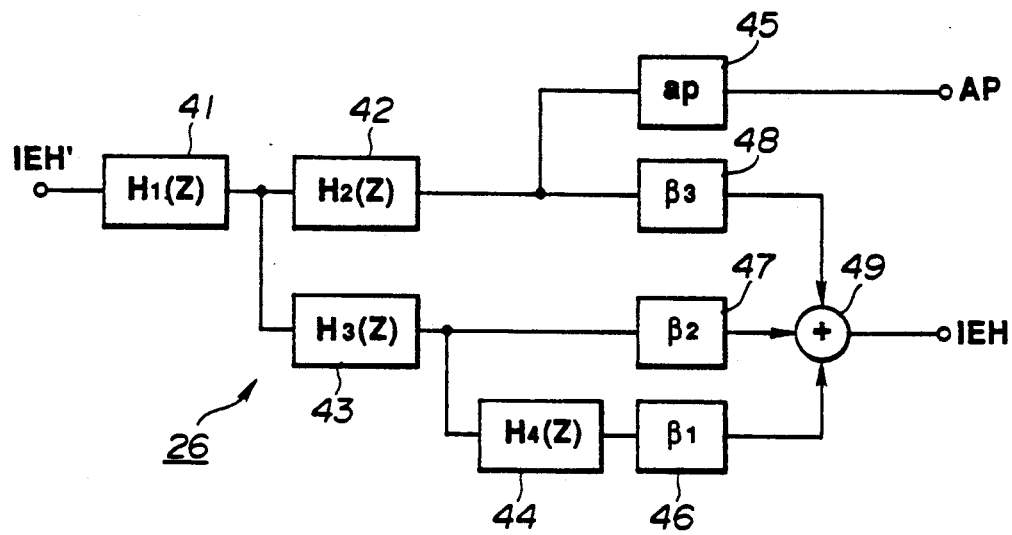
FIG. 13 is a block diagram of a first digital filter circuit of the detail signal generator.

FIG. 13 illustrates a preferred construction of first digital filter 26. As shown therein, filter 26 includes a first filter block 41 having a transfer function $H_1(z)$ as defined by equation 16 below:

$$H_1(z) = \frac{1}{4}(-z^{-4} + 2_z^{-2} - 1) \quad (16)$$

a second filter block 42 having a transfer function $H_2(z)$ as defined by equation 17 below:

$$H_2(z) = \frac{1}{4}(-z^{-2} + 2z^{-1} - 1) \quad (17)$$

a third filter block 43 having a transfer function $H_3(z)$ as defined by equation 18 below:

$$H_3(z) = \frac{1}{4}(-z^{-2} + 2z^{-1} - 1) \quad (18)$$

a fourth filter block having a transfer function $H_4(z)$ as defined by equation 19 below:

$$H_4(z) = \frac{1}{4}(-z^{-4} + 2z^{-2} - 1) \quad (19)$$

coefficient circuits 45 to 48 for providing weighting coefficients $a_p$, $\beta_1$, $\beta_2$, $\beta_3$, respectively, and a summation circuit 49 for summing the outputs of the coefficient circuits 46 to 48.

Figure 14:
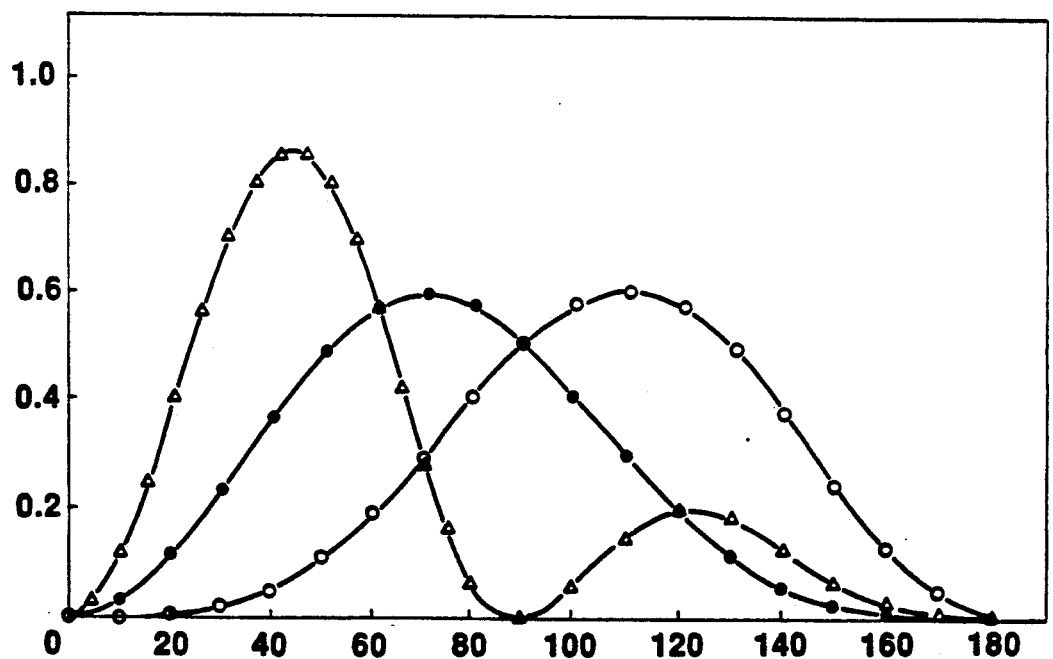
FIG. 14 is a graph showing filtering characteristics of the first digital filter circuit.

The first digital filter circuit 26 has the filtering characteristics shown in FIG. 14 and operates at a processing rate of 2 fs on the output IEH' signal supplied from the mixer 25 to form filter output signals IEH and AP which may be expressed by the following equations:

$$IEH = \frac{1}{4}(-z^{-4} + 2z^{-2} - 1) \times \quad (20)$$
$$\left\{ \frac{\beta_1}{16}(-z^{-4} + 2z^{-2} - 1) \cdot (z^{-2} + 2z^{-1} - 1) + \right.$$
$$\frac{\beta_2}{4}(z^{-2} + 2z^{-1} - 1) +$$
$$\left. \frac{\beta_3}{4}(z^{-2} + 2z^{-1} - 1) \right\} \cdot IEH'$$

$$AP = \frac{a_p}{16}(-z^{-4} + 2z^{-2} - 1) \times \quad (21)$$
$$(-z^{-2} + 2z^{-1} - 1) \cdot IEH'$$

Figure 15:
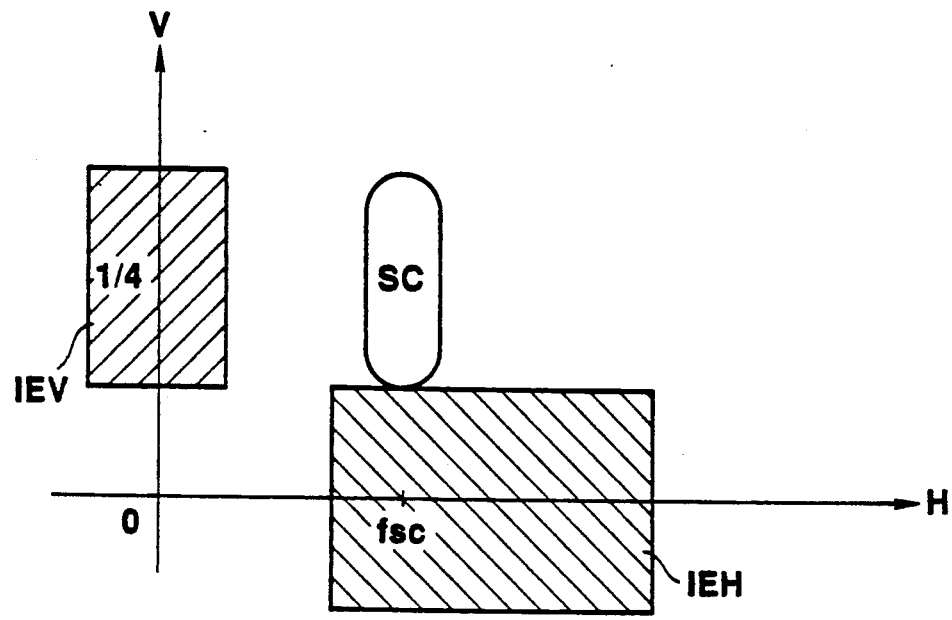
FIG. 15 is a diagrammatic view showing frequency characteristics of the detail signal formed in the detail signal generator.

The output signal IEH' from the mixer 25 is a combination of the filter output GH from the first comb filter 23 and the filter output RH from the second comb filter 24, and is band-limited by the comb filters 23 and 24 in the vertical direction in a two-dimensional frequency space as shown in FIG. 15. The horizontal detail signal IEH, obtained by band-limiting the combined output signal IEH' in the horizontal direction by the first digital filter circuit 26 which has by-pass filtering characteristics having at least two zero points at fs in the vicinity of the color subcarrier frequency fsc of the composite color image signal, contains only a relatively minor amount of leakage components in the color subcarrier frequency region SC, which is located at (fsc, ¼) on the two-dimensional frequency space shown in FIG. 15. As a result, the horizontal detail signal IEH may be subjected to a high quality horizontal contour enhancement operation without cross-color interferences....

The filter output signal IEH from the first digital filter 26 is supplied as the horizontal detail signal to the summation circuit 29, and the filter output signal AP from filter 26 is supplied through a first core circuit 30, which performs a non-linear operation, to a summation circuit 34.

Figure 16:
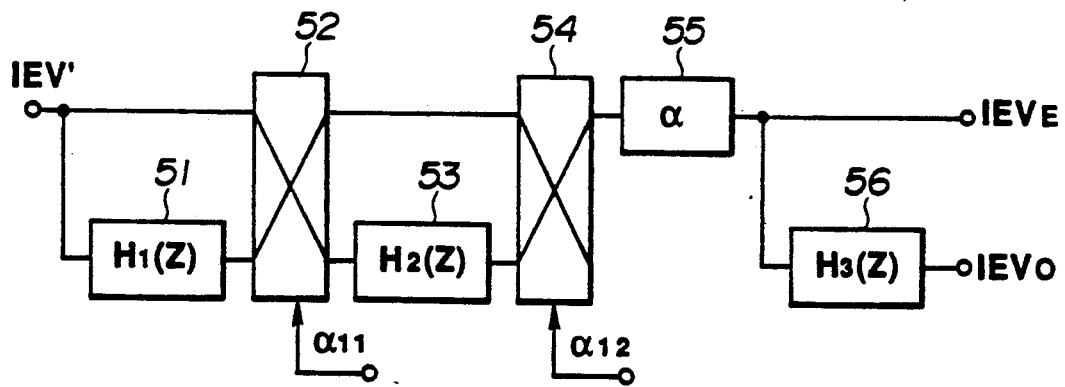
FIG. 16 is a block diagram of a second digital filter circuit of the detail signal generator.

FIG. 16 illustrates a preferred construction of the second digital filter 27. As shown therein, filter 27 includes a first filter block 51 having a transfer function $H_1(z)$, as defined by equation 22 below:

$$H_1(z) = \frac{1}{4}(z^{-8} + 2z^{-4} + 1) \quad (22)$$

which receives the vertical detail signal IEV' from the mixer 25, a first switching circuit block 52 for selecting either the filtered output signal from the first filter block 51 or the vertical detail signal IEV' and for switching filter characteristics, a second filter block 53 having a transfer function $H_2(z)$ as defined by equation 23 below:

$$H_2(z) = \frac{1}{4}(z^{-4} + 2z^{-2} + 1) \quad (23)$$

which receives the first selection output signal from the first switching circuit block 52, a second switching circuit block 54 for selecting either the filtered output signal from the second filter block 53 or the first selection output signal and for switching filter characteristics, a coefficient circuit 55 for multiplying the second selection output signal from the second switching circuit block 54 by a weighting coefficient $\alpha$, and a third filter block 56 having a transfer function $H^3(z)$ as defined by equation 24 below:

$$H_3(z) = \frac{1}{2}(1 + z^{-2}) \quad (24)$$

which receives the output signal from the coefficient circuit 55.

The second digital filter circuit 27 operates at a processing rate of fs on the received fs rate vertical detail signal IEV' from mixer 25. As previously mentioned, selected filter output signals from comb filters 23 and 24 are mixed in mixer 25 to form signal IEV'. While being processed through comb filters 23 and 24, these filters signals are subjected to the filtering characteristics H(z) of the comb filters, namely:

$$H(z) = \frac{1}{4}(z^{-2} + 2z^{-1} + 1) \quad (25)$$

Figure 17:
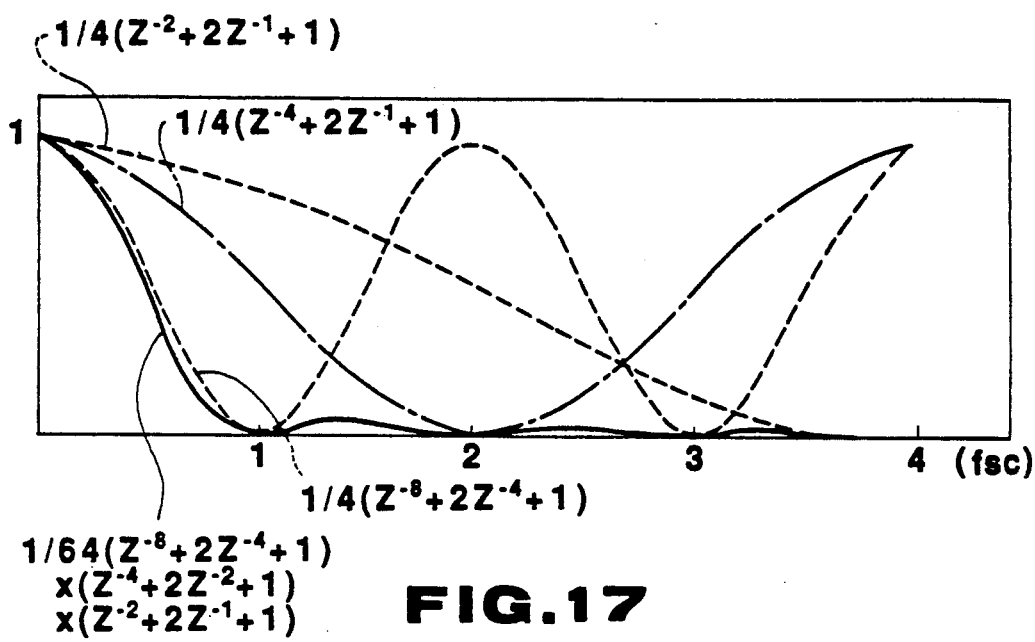
FIG. 17 is a graph showing filtering characteristics of the second digital filter circuit

Circuit 27 provides, in turn, filtering characteristics $H_1(z)$ having a zero point at fsc as shown by a broken line in FIG. 17 and filtering characteristics $H_z(z)$ having a zero point at 2 fsc, as shown by a chain-dotted line in FIG. 17. As a result, circuit 27 forms a vertical detail signal IEV having a transfer function $H_0(z)$ as defined by equation 26 below:

$$H_0(z) = \frac{1}{64}(z^{-8} + 2z^{-4} + 1) \times \quad (26)$$
$$(z^{-4} + 2z^{-2} + 1) \times (z^{-2} + 2z^{-1} + 1)$$

and as shown by a solid line in FIG. 17. Vertical detail signal IEV is supplied to the summation circuit 29.

The vertical signal IEV' is combined from the filtered output signal GV from the first comb filter 23 and the filtered output signal RV from the second comb filter 24, and is band-limited by these comb filters in the vertical direction in the two-dimensional frequency space of FIG. 15. The vertical detail signal IEV, produced by band-limiting the IEV' signal in the horizontal direction by the second digital filter circuit 27 which has two or more zero points in the vicinity of the color subcarrier frequency fsc of the composite color image signal, contains only a relatively minor amount of leakage components in the color subcarrier frequency region SC, which is located at (fsc, ¼) on the two-dimensional frequency space of FIG. 15. As a result, the vertical detail signal IEV may be subjected to a high quality vertical contour enhancement operation without cross-color interference.

Figure 18:
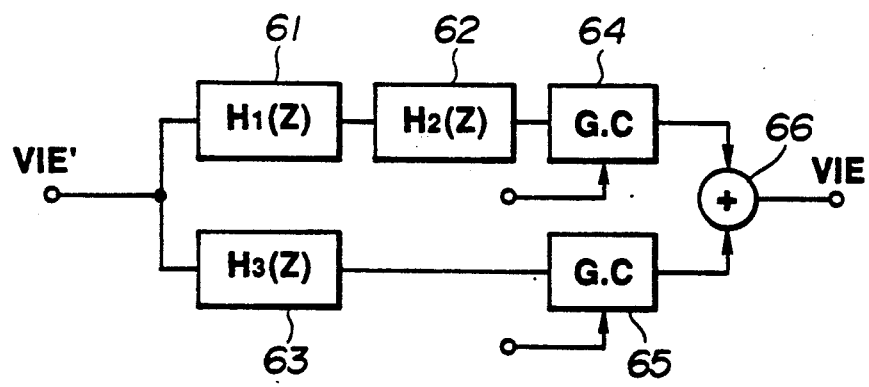
FIG. 18 is a block diagram showing an alternate configuration of the second digital filter circuit of the detail signal generator.

FIG. 18 shows an alternate embodiment of the second digital filter circuit 27. As shown in FIG. 18, the alternate digital filter circuit includes a first filter block 61 having a transfer function $H_1(z)$ as defined by equation 27 below:

$$H_1(z) = \frac{1}{4}(z^{-8} + 2z^{-4} + 1) \tag{27}$$

which receives the vertical detail signal IEV' from the mixer 25, a second filter block 62 having a transfer function $H_2(z)$ as defined by equation 28 below:

$$H_2(z) = \frac{1}{4}(z^{-4} + 2z^{-2} + 1) \tag{28}$$

which receives the filtered output signal from the first filter block 61, a third filter block 63 having a transfer function $H_3(z)$ as defined by equation 29 below:

$$H_3(z) = \frac{1}{4}(z^{-8} + 2z^{-4} + 1) \tag{29}$$

which receives the vertical detail signal IEV' from mixer 25, a first gain adjustment circuit 64 for adjusting the signal level of the filtered output signal from filter block 62, a second gain adjustment circuit 65 for adjusting the signal level of the filtered output signal from filter block 63 and a summation circuit 66 for summing the level-adjusted filtered output signals from the gain adjustment circuits 64 and 65.

Figure 19A:
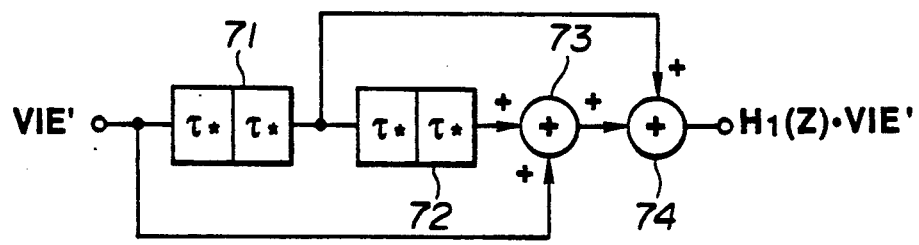
FIGS. 19A, 19B and 19C are block diagrams of the first, second and third filter blocks in the second digital filter circuit shown in FIG. 18.
Figure 19B:
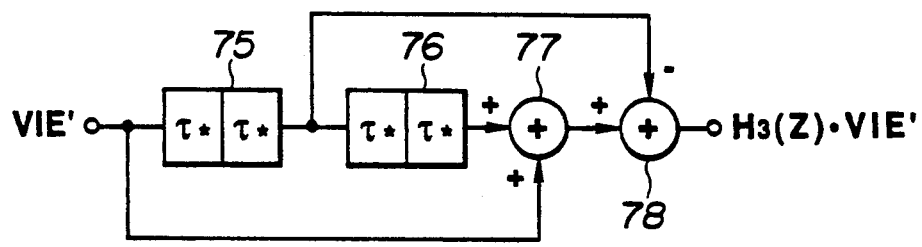
Figure 19C:
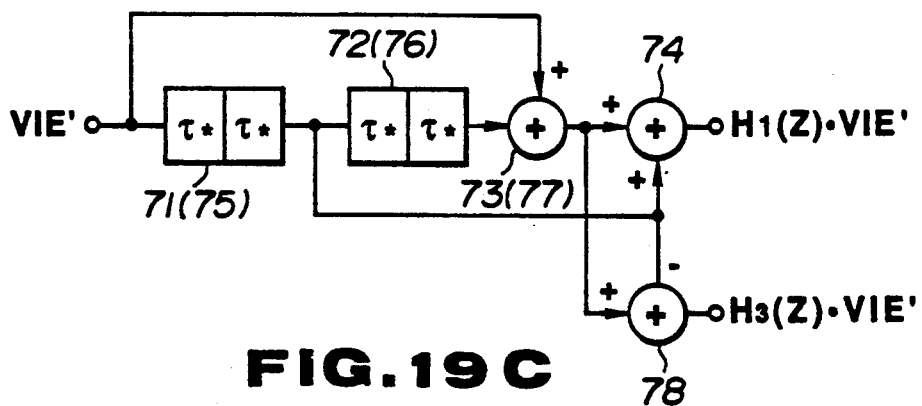

The first filter block 61 which provides the transfer function $H_1(z)$ includes two delay means 71 and 72, each providing a delay of $2\tau^*$, in which $\tau^*$ is a unit delay for the processing rate of fs, and two summation circuits 73 and 74, as shown in FIG. 19A. The third filter block 63, which provides the above mentioned transfer function $H_3(z)$, includes two delay means 75 and 76, each providing a delay of $2\tau^*$, in which $\tau^*$ is a unit delay for the processing rate of fs, and two summation circuits 77 and 78, as shown in FIG. 19B. Since the first filter block 61 and the third filter block 63 include similar parts, the filter blocks may be constructed so as to use common delay means and one of the summation circuits, aq shown in FIG. 19C.

The alternate second digital filter circuit 27 of FIG. 18 operates at a processing rate of fs, on the vertical detail signal IEV' which contains superimposed cross-color suppression signals. Thus, cross-color interference components are suppressed in the color subcarrier frequency region SC, located at (fsc, ¼) on the two-dimensional space shown in FIG. 15.

More specifically, the first and second filter blocks 61 and 62, respectively, in the second digital filter circuit 27 provide respective filtering characteristics $H_1(z)$ having a zero point at fsc as shown by a broken line in FIG. 17 and filtering characteristic $H_2(z)$ having a zero point at 2 fsc as shown by a chain-dotted line in FIG. 17, to the fs rate vertical detail signal IEV'. As previously described, the signals forming signal IEV' are subjected to the filtering characteristics H(z) of the comb filters, namely:

$$H(z) = \frac{1}{4}(z^{-2} + 2z^{-1} + 1) \tag{30}$$

As a result, circuit 27 produces a vertical detail signal IEV having the transfer function $H_0(z)$ defined as follows:

$$H_0(z) = \frac{1}{64}(z^{-8} + 2z^{-4} + 1) \times \tag{31}$$
$$(z^{-4} + 2z^{-2} + 1) \times (z^{-2} + 2z^{-1} + 1)$$

and as shown by the solid line in FIG. 17. That is, by virtue of the two-pass filtering characteristics having two or more zero points in the vicinity of the color subcarrier frequency fsc of the composite color video signal, the first and the second filter blocks 61 and, respectively, generate the vertical detail signal IEV which is band-limited in the horizontal direction. This vertical detail signal IEV contains only a relatively small amount of leakage components in the color subcarrier frequency region SC, located at (fsc, ¼) in FIG. 15. More specifically, FIG. 20D shows the response at the cross-section of the horizontal line contained in the color subcarrier frequency region SC (fsc, ¼) in the two-dimensional frequency space of FIG. 15. Further, as previously described, the vertical detail signal IEV' is the sum of the filter output GV from the first comb filter 23 and the filter output RV from the second comb filer 24. Due to comb filters 23 and 24, signal IEV' is band-limited in the vertical direction on the two-dimensional frequency space of FIG. 15. The third filter block 63 provides the above mentioned transfer function $H_3(z)$ to the vertical detail signal IEV' to generate cross-color suppression signals having a negative response in the vicinity of the color subcarrier frequency fsc of the composite color video signal, as shown in FIG. 20C. The summation circuit 66 transmits the vertical detail signal IEV with the cross-color suppression signal superimposed thereon to the summation circuit 29 of FIG. 12.

Thus, the vertical signal IEV, on which the cross-color suppression signal is superimposed, is summed to the signal on the main line to enhance the baseband component and to suppress the signal level in the color subcarrier frequency region SC located at (fsc, ¼) in the two-dimensional space of FIG. 15, as shown in FIG. 20D, so as to perform high-quality vertical contour enhancement without accompanying cross-color interferences.

The cross-color suppression signal does not necessarily have to be superimposed on the vertical detail signal IEV inside digital filter circuit 27, but instead the cross-color suppression signal may be generated and superimposed at an output stage of the detail signal generator 11.

The summation circuit 29 operates at a sampling rate of 2 fs to sum the 2 fs clock rate horizontal detail signal IEH from the first digital filter circuit 26 and the fs clock rate vertical detail signal IEV from the second digital filter circuit 27. A 2 fs clock rate summation output signal from the summation circuit 29 is supplied to a multiplication circuit 32 by way of a second core circuit 31 which, in turn, is adapted for performing a non-linear processing operation.

The level-dependent signal generator 28, which receives the output signal LEV from the mixer 25 as the level signal, generates a level-dependent signal LD as a function of the level signal LEV, and transmits the level-dependent signal to the multiplication circuit 32 by way of a multiplication circuit 33 which is adapted for multiplying the level-dependent signal by an LD weighting coefficient (not shown).

The multiplication circuit 32 multiplies the output signal from the second core circuit 31 by the level-dependent signal LD multiplied by the weighting coefficient at the multiplication circuit 33, and transmits the multiplication output signal to the summation circuit 34.

The summation circuit 34 sums the output signal from the first core circuit 30 to the multiplication output signal from the multiplication circuit 32, and outputs the summed output as the 2 fs clock rate detail signal $D_{IE^{\ast\ast}}$.

The summation circuits, 14R, 14G and 14B of FIG. 5, to which the 2 fs clock detail signal $IE_{IE^{\ast\ast}}$ is supplied from the above described detail signal generator 11, respectively sum the 2 fs clock rate detail signal $D_{IE^{\ast\ast}}$ to the 2 fs rate three-color data $D_{R^{\ast\ast}}$, $D_{G^{\ast\ast}}$ and $D_{B^{\ast\ast}}$ supplied from the interpolators 13R, 13G and 13B to perform an enhancement operation. The summation circuits 14R, 14G and 14B supply the image enhanced three-color data $D_{R^{\ast\ast}}$, $D_{G^{\ast\ast}}$ and $D_{B^{\ast\ast}}$ to the gamma compensation circuits 15R, 15G and 15B, respectively.

The second core circuit 31 receives the summed output signal from the summation circuit 29 and performs thereon a non-linear arithmetic operation in which compression characteristics may be set independently on the positive and negative sides with respect to a predetermined level, and which may be constructed as shown in FIG. 211.

Figure 21:
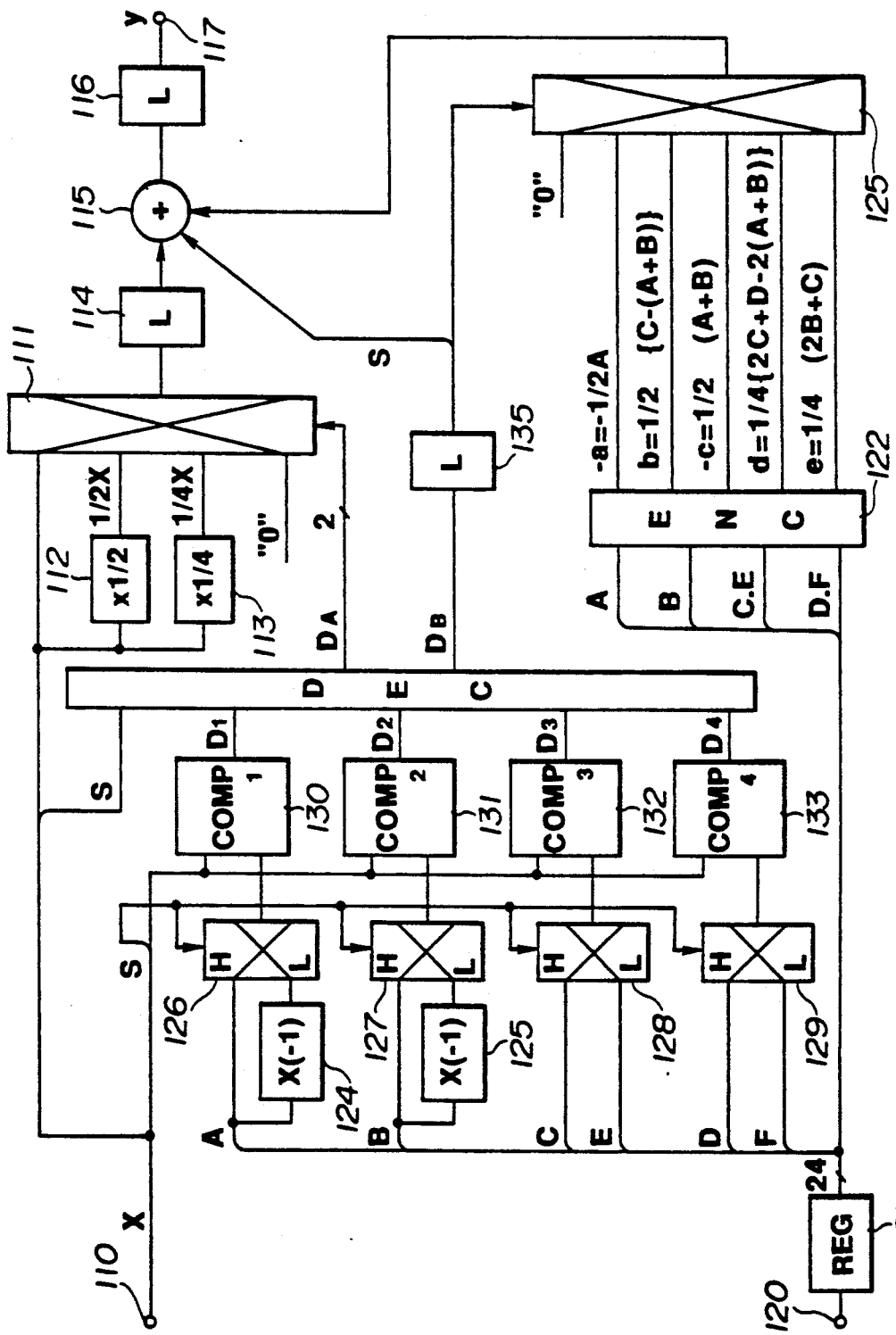
FIG. 21 is a block diagram of a core circuit of the detail signal generator shown in FIG. 12.

As shown in FIG. 21, a signal level data x of the summation output signal from the summation circuit 29 is supplied to a data input terminal 110. Control data for setting the operating characteristics of the second core circuit 31 are supplied to the second data input terminal 120.

The signal level data x is directly supplied from first data input terminal 110 to data selector 111 and to the data selector by way of a ½ multiplication circuit 112 and a ¼ multiplication circuit 113.

A zero (0) value data is also supplied to the data selector 111 as the fourth input data signal. The data selector 111 is responsive to a 2-bit control data signal from a decoder 134, as later described, to select one of the input data, that is, the signal level data x, the output data x/2 from the ½ multiplication circuit 112, the output data x/4 from the ¼ multiplication circuit 113 or the zero (0) data. The data selector 111 supplies the selected data to a summation circuit 115 by way of a latch circuit 114.

The summation circuit 115 sums the coefficient data from a data selector 123, as later described, to the output data from the latch circuit 114. The summed output data from circuit 115 is supplied as compressed output data (y) to a data output terminal 117 by way of a latch circuit 116.

Polarity data (s) of the signal level data (x), which is received at input terminal 110, is supplied to each of the four data selectors 126, 127, 128 and 129 and to the decoder 134. The signal level data (x) is further supplied to first to fourth data comparators 130, 131, 132 and 133.

The control data supplied to the second data input terminal 120 are stored in a register 121 and thereafter supplied to an encoder 122 and to the data comparators 130, 131, 132 and 133 by way of data selectors 126, 127, 128 and 129, respectively.

Figure 22:
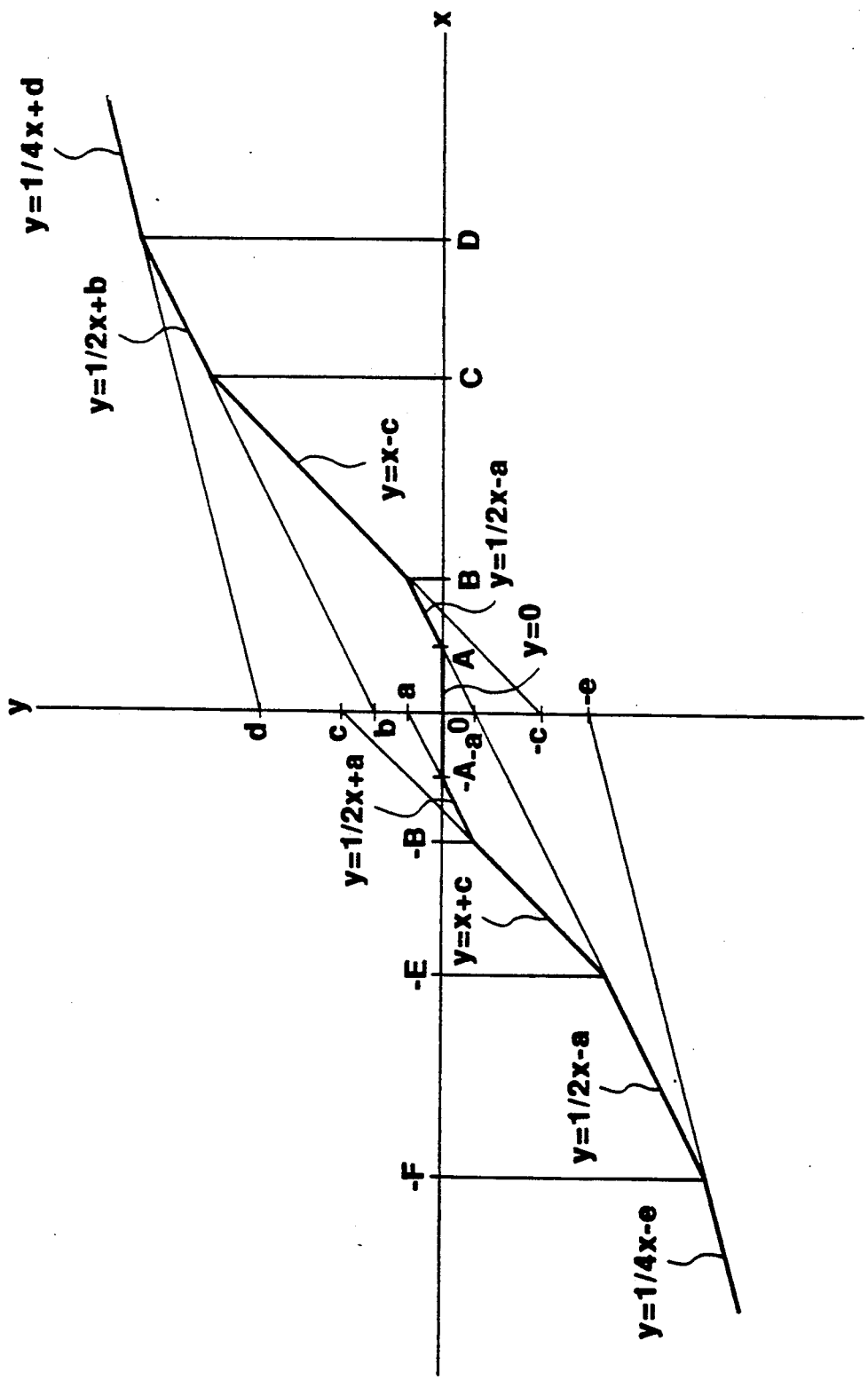
FIG. 22 is a chart showing characteristics of a non-linear operation of the core circuit shown in FIG. 21.

The control data stored in the register 121 have control values +A, +B, +C, +D, −E and −F which are related to one another by the following equation:

$$-F < -E < 0 < +A < +B < +C < +D$$

which correspond to the signal levels at the knee points of the operational characteristics as shown in FIG. 22.

On the basis of the control values +A, +B, +C, +D, −E and −F which are represented by the control data, the encoder 122 forms coefficient data (−a), (b), (−c), (d) and (e) as shown by the formulas (32) to (36):

$$-a = -\frac{1}{2} A \tag{32}$$

$$b = \frac{1}{2} \{C - (A + B)\} \tag{33}$$

$$-c = -\frac{1}{2} (A + B) \tag{34}$$

$$d = -\frac{1}{4} \{2C + D - 2(A + B)\} \tag{35}$$

$$e = \frac{1}{4} (2B + C) \tag{33}$$

These coefficient data are supplied from encoder 122, to data selector 123.

The data selector 123 is also supplied with the zero (0) value data. The data selector 123, in response to the control data supplied from decoder 134 by way of latch circuit 135, selects one of the input data, that is one of the coefficient data (−a), (b), (−c), (d), (e) or the zero value data (0), and supplies the selected data to the summation circuit 115.

The first to fourth data selectors 126, 127, 128 and 129 select one of the control values (+A), (+B), (+C), (+D), (−E) or (−F), which are represented by the control data stored in register 121, as a function of the polarity data s of the signal level data (x), as described hereinafter.

The first data selector 126 selectively supplies the control value (+A), represented by the control data, or the control value (−A), obtained by multiplying the control value (+A) by a coefficient (−1) at a −1 multiplication circuit 124 thereby inverting the signal polarity, to the first data comparator 130. The data selector 126 selects the control value (+A) or (−A) in dependance upon the signal level data (x), that is, the data selector selects the control value (+A) when the signal level data (x) is positive and selects the control value (−A) when the signal level data (x) is negative. In a similar manner, the second data selector 127 selectively supplies the control value (+B), represented by the above control data, or the control value (−B), obtained by multiplying the control value (+B) by a coefficient (−1) at a −1 multiplication circuit 125 thereby inverting the signal polarity, to the second data comparator 131. The data selector 127 selects the control value (+B) or (−B) when the signal level data (x) is positive or negative, respectively. The third data selector 128 selectively supplies the control value (+C) or (−E), represented by the above control data, to the third data comparator 132. Data selector 128 selects the control value (+C) or (−E) when the signal level data (x) is positive or negative, respectively. Finally the fourth data selector 129 selectively supplies the control value (+D) or (−F), represented by the above control data, to the fourth data comparator 133. The data selector 129 selects the control value (+D) or (−F) when the signal level data (x) is positive or negative, respectively.

The first to fourth data comparators 130, 131, 132 and 133 respectively compare the signal level data (x) from the first data input terminal 110 to the control values (+A) or (−A), (+B) or (−B), (+C) or (−E) and (+D) or (−F), which are respectively selected by the first to fourth data selectors 126, 127, 128 and 129. The respective comparison outputs from each of the data comparators 130, 131, 132 and 133 are supplied to decoder 134 as described below.

More specifically, the first data comparator 130 compares the signal level data (x) to the control value (+A) or (−A) selected by first data selector 126. As a result of the comparison, comparator 130 supplies to decoder 134 a comparison output $D_1$ which is low when the signal level data (x) is within the range of (+A) to (−A) and is high when the signal level data (x) is outside the range of (+A) to (−A). The second data comparator 131 compares the signal level data (x) to the control value (+B) or (−B) selected by second data selector 127 and, as a result, supplies to decoder 134 a comparison output (Dz) which is low or high depending on whether the signal level data (x) is within or outside the range (+B) to (−B), respectively. The third data comparator 132 compares the signal level data (x) to the control value (+C) or (−E) selected by the third data selector 128 and, as a result, supplies to decoder 134 a comparison output ($D_3$) which is low or high depending on whether the signal level data (x) is within or outside the range of the control values (+C) to (−E), respectively. The fourth data comparator 133 compares the signal level data (x) to the control value (+D) or (−F) selected by the fourth data selector 129 and, as a result, supplies to decoder 134 a comparison output ($D_4$) which is low or high depending on whether the signal level data (x) is within or outside the range of the control values (+D) to (−F), respectively.

The decoder 134 decodes the polarity data (s) of the signal level data (x) and the comparison output data ($D_1$), ($D_2$), ($D_3$) and ($D_4$) from the first to fourth data comparators 130 to 133, respectively, to form control data ($D_A$) for data selector 111 and control data ($D_B$) for data selector 123. Control data ($D_A$) and ($D_B$) are used to designate the data to be selected by data selectors 111 and 123, respectively, as shown in Table 1.

The summation circuit 115 sums the selected output data supplied from data selector 111, as a function of the control data $D_A$, via latch circuit 114 to the coefficient data from the data selector 123, as a function of the control data $D_B$, and outputs through latch circuit 116, as shown in FIG. 21, an output data (y) which may be expressed as follows:

$$y = \tfrac{1}{4} x + d \tag{37}$$

for the range of x > +D, and $$y = \tfrac{1}{2} x + b \tag{38}$$

for the range of +D ≧ x > +c, and $$y = x - c \tag{39}$$

for the range of +c ≧ x > +B, and $$y = \tfrac{1}{2} x - a \tag{40}$$

for the range of +B ≧ x > +A, and $$y = 0 \tag{41}$$

for the range of +A ≧ x > −A, and $$y = \tfrac{1}{2} x + a \tag{42}$$

for the range of −A ≧ x > −B, and $$y = x + c \tag{43}$$

for the range of −B ≧ x > −E, and $$y = \tfrac{1}{2} x - a \tag{44}$$

for the range of −E ≧ x > −F, and $$y = \tfrac{1}{4} x - e \tag{45}$$

for the range of −F ≧ x.

Thus, the second core circuit 31 performs a non-linear compressing operation which for the range of +B ≧ x > −B differs on the positive and negative side only with respect to the polarity and outside the range of +B ≧ x > −B performs a non-linear compressing operation which differs on the positive and negative sides with respect to the compression characteristics. Core circuit 31 further performs the clipping operation of setting y equal to zero (y=0) for the range of +A ≧ x > A.

By modifying the control values (+A), (+B), (+C), (+D), (−E) and (−F) of the control data supplied to register 121, the positions of the knee points shown in FIG. 22 may be set to ranges of various inclinations optionally and independently.

Figure 23:
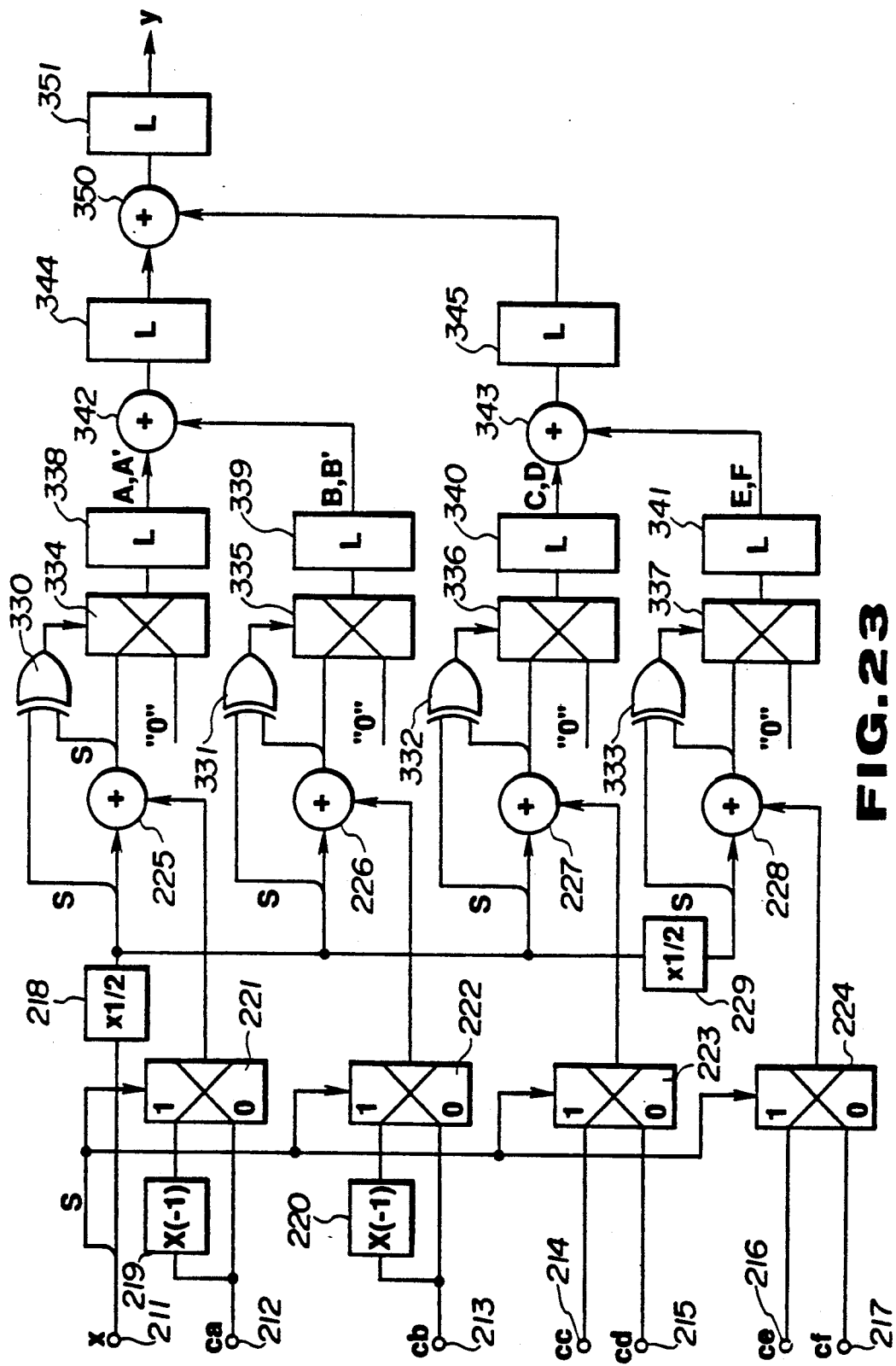
FIG. 23 is a block diagram showing an alternate configuration of the core circuit of the detail signal generator shown in FIG. 12.

An example of A second core circuit 31 for setting ranges of various inclinations optionally and independently is shown in FIG. 23.

TABLE 1

Table Showing Decoder Operation

| input data x | s | $D_1$ | $D_2$ | $D_3$ | $D_4$ | $D_A$ | $D_B$ | s |
|---|---|---|---|---|---|---|---|---|
| x > +D | H | H | H | H | H | x/4 | d | H |
| +D ≧ x > +C | H | H | H | H | L | x/2 | b | H |
| +C ≧ x > +B | H | H | H | L | L | x | −c | H |
| +B ≧ x > +A | H | H | L | L | L | x/2 | −a | H |
| +A ≧ x > 0 | H | L | L | L | L | 0 | 0 | H |
| 0 ≧ x > −A | L | L | L | L | L | 0 | 0 | H |
| −A ≧ x > −B | L | H | L | L | L | 0 | 0 | H |
| −B ≧ x > −E | L | H | H | L | L | x | c | L |
| −E ≧ x > −F | L | H | H | H | L | x/2 | a | H |
| −F ≧ x | L | H | H | H | H | x/4 | e | L |

Referring to FIG. 23, a signal level data (x) which is the summation signal of the vertical detail signal IEV and the horizontal detail signal IEH from the summation circuit 29 is supplied to first data input terminal 211. Control data (ca), (cb), (cc), (cd), (ce) and (cf), which provide the points of intersection with the Y axis of the characteristic lines (A), (A'), (B), (B'), (C), (D), (E) and (F) which govern the operational characteristics of the second core circuit 31, are transmitted to second to seventh data input terminals 212, 213, 214, 215, 216 and 217, respectively.

The signal level data x is supplied from first data input terminal 211 to a first ½ multiplication circuit 218, while polarity data s thereof is supplied as selection control data to first to fourth data selectors 221, 222, 223 and 224.

The control data (ca) is supplied from second data input terminal 212 to first data selector 221 directly and by way of a −1 multiplication circuit 219. The first data selector 221 performs a selection operation as a function of the polarity data s, in such a manner that, when the magnitude of the signal level data x is positive, the inverted polarity value (−ca) obtained from −1 multiplication circuit 219 is selected and, when the magnitude of the signal level data (x) is negative, the control data ca is selected. The selected output data from first data selector 221 are supplied to first summation circuit 225.

The control data (cb) is supplied from the third data input terminal 213 to the second data selector 222 both directly and by way of a −1 multiplication circuit 220. The second data selector 222 performs a selection operation as a function of the polarity data s, in such a manner that, when the magnitude of the signal level data x is positive, the inverted polarity data −cb obtained from −1 multiplication circuit 220 is selected and, when the magnitude of the signal level data x is negative, the control data cb is selected. The selected output data from the second data selector 222 are supplied to second summation circuit 226.

The control data (cc) and (cd) are supplied from fourth and fifth data input terminals 214 and 215, respectively to third data selector 223. This third data selector 223 performs a selection operation as a function of the polarity data s, in such a manner that, the control data (cc) or (cd) are selected when the magnitude of the signal level data x is positive or negative, respectively. The selection data from third data selector 223 are supplied to third summation circuit 227.

The control data (ce) and (cf) are supplied from sixth and seventh data input terminals 216 and 217, respectively, to fourth data selector 224. The fourth data selector 224 performs a selection operation as a function of the polarity data s, in such a manner that, the control data (ce) or (cf) are selected when the magnitude of the signal level data x is positive or negative, respectively. The selective output data from fourth data selector 224 are supplied to fourth sum circuit 228.

The first ½ multiplication circuit 218 multiplies the signal level data x from first data input terminal 211 by a coefficient having a value of ½ and supplies multiplication output x/2 to first to third summation circuits 225, 226 and 227, respectively, and to a second ½ multiplication circuit 229, while applying its polarity data s to first to third exclusive OR circuits 330, 331 and 332, respectively. The second ½ multiplication circuit 229 multiplies the multiplication output x/2 from first ½ multiplication circuit 218 by a coefficient having a value of ½ and supplies multiplication output x/4 to fourth summation circuit 228, while applying its polarity data s to fourth exclusive OR circuit 333.

The first summation circuit 225 adds the control data (−ca) or (ca), selected by the first data selector 221 as a function of the polarity of the signal level data x, and multiplication output x/2 from first ½ multiplication circuit 218 and produces a summation output having a value of (x/2−ca) or (x/2+ca) depending on whether the signal level data are positive or negative, respectively. The summed output from first summation circuit 225 is supplied to fifth data selector 334, while its polarity data s is supplied to first exclusive OR circuit 330.

This first exclusive OR circuit 330 performs an exclusive OR operation on the polarity data s of the multiplication output x/2 received from first ½ multiplication circuit 218 and the polarity data s of the summed output received from first sum circuit 225 and supplies an exclusive OR output, which has a relatively low value when the magnitude of the summed output (x/2−ca) is negative or the magnitude of the summed output (x/2+ca) is positive and which otherwise has a relatively high value, to fifth data selector 334 as control data.

Zero (0) data are supplied as second selection data to fifth data selector 334. This fifth data selector 334 performs a selection operation as a function of the exclusive OR output from first exclusive OR circuit 330, in such a manner that, the zero (0) value data or the summed output from first summation circuit 225 are selected when the exclusive OR output is low or high, respectively. The selection output from fifth data selector 334 corresponds to the characteristic lines (A),(A') shown in FIG. 24. The selection output from fifth data selector 334 is applied via first latch circuit 338 to fifth summation circuit 342.

The second summation circuit 226 sums control data (−cb) or (cb), selected by second data selector 222 as a function of the polarity of signal level data x, to the multiplication output x/2 from ½ multiplication circuit 218 and produces an addition output having a value of (x/2−cb) or (x/2+cb) depending on whether the signal level data x are positive or negative, respectively. The summed output from second summation circuit 226 is supplied to sixth data selector 335, while its polarity data s is supplied to second exclusive OR circuit 331.

This second exclusive OR circuit 331 performs an exclusive OR operation on the polarity data s of multiplication output x/2 received from first ½ multiplication circuit 218 and the polarity data s of the summed output received from second sum circuit 226 and supplies an exclusive OR output, which has a relatively low valve when the summed output (x/2−cb) is negative or when the summed output (x/2+cb) is positive and otherwise has a relatively high value, to sixth data selector 335 as control data.

Zero (0) value data are applied as selection data to this sixth data selector 335. This sixth data selector 335 performs a selection operation as a function of the exclusive OR output from second exclusive OR circuit 331, in such a manner that, the zero value data or the summed output from second summation circuit 226 are selected when the exclusive or output is low or high, respectively. The selection output from sixth data selector 335 corresponds to the characteristic lines (B), (B') shown in FIG. 24. The selection output from sixth data selector 335 is supplied via second latch circuit 339 to fifth summation circuit 342.

The third summation circuit 227 sums the control data (−cc) or (cd), selected by third data selector 223 as a function of the polarity of signal level data x, to the multiplication output x/2 from first 1½ multiplication circuit 218 and produces a summation output having a value of (x/2−cc) or x/2+cd) depending on whether the signal level data x are positive or negative, respectively. The summed output from third summation circuit 227 is supplied to a seventh data selector 336 while applying its polarity data s to third exclusive OR circuit 332.

This third exclusive OR circuit 332 performs an exclusive OR operation on the polarity data s of the multiplication output x/2 received from ½ multiplication circuit 218 and the polarity data s of the summation output received from third summation circuit 227 and supplies an exclusive OR output, which has a relatively low value when the value of the summed output (x/2−cc) is negative or when the value of the summed output (x/2+cd) is positive and which has a relatively high value otherwise, to seventh data selector 336 as control data.

Zero (0) value data are applied as second selection data to seventh data selector 336. This seventh data selector 336 performs a selection operation as a function of the exclusive OR output from third exclusive OR circuit 332, in such a manner that the zero value data or the summed output from third sum circuit 227 are selected when the exclusive OR circuit output is low or high, respectively. The selection output by the seventh data selector 336 corresponds to the characteristic lines (C), (D) shown in FIG. 24. The selection output from the seventh data selector 336 is applied via third latch circuit 340 to sixth summation circuit 343.

The fourth summation circuit 228 sums the control data (−ce) or (cf), selected by fourth data selector 224 as a function of the polarity of the signal level data x, to the multiplication output x/4 from second ¼ multiplication circuit 229, and produces a summed output having a value of (x/4−ce) or (x/4+cf) depending on whether the signal level data x are positive or negative, respectively. The summed output from fourth summation circuit 228 is supplied to eighth data selector 337, while supplying its polarity data s to fourth exclusive OR circuit 333.

This fourth exclusive OR circuit 333 performs an exclusive OR operation on the polarity data s of the multiplication output x/4 received from second ¼ multiplication circuit 229 and the polarity data s of the summed output received from fourth sum circuit 228 and supplies an exclusive OR output, which has a relatively low value when the summed output (x/4−ce) is negative or when the summed output (x/4+cf) is positive and which has a relatively high value otherwise, to eighth data selector 337 as control data.

Zero (0) value data are applied as second selection data to eighth data selector 337. This eighth data selector 337 performs a selection operation as a function of the exclusive OR output from fourth exclusive OR circuit 333, in such a manner that the zero value data or the summed output from fourth summation circuit 228 are selected when the exclusive OR output is low or high, respectively. The selection output from this eighth data selector 337 corresponds to the characteristic lines (E), (F) shown in FIG. 24. The selection output from this eighth data selector 337 is applied via fourth latch circuit 341 to sixth summation circuit 343.

The summation circuit 342 sums the selection output supplied from fifth data selector 334 via first latch circuit 338 to the selection output supplied from sixth data selector 335 via second latch circuit 339. The summed output from fifth summation circuit 342 is supplied via fifth latch circuit 344 to seventh sum circuit 350. The sixth summation circuit 343 sums the selection output supplied from seventh data selector 336 via third latch circuit 340 to the selection output supplied from eighth data selector 337 via fourth latch circuit 341. The summed output from sixth summation circuit 343 is supplied via sixth latch circuit 345 to seventh summation circuit 350. This seventh summation circuit 350 sums the summed output from fifth summation circuit 342 supplied via fifth latch circuit 344 to the summed output from sixth summation circuit 343 supplied via sixth latch circuit 345. The summed output from seventh summation circuit 350 is outputted via seventh latch circuit 351 as non-linear compressed output data (y).

Figure 24:
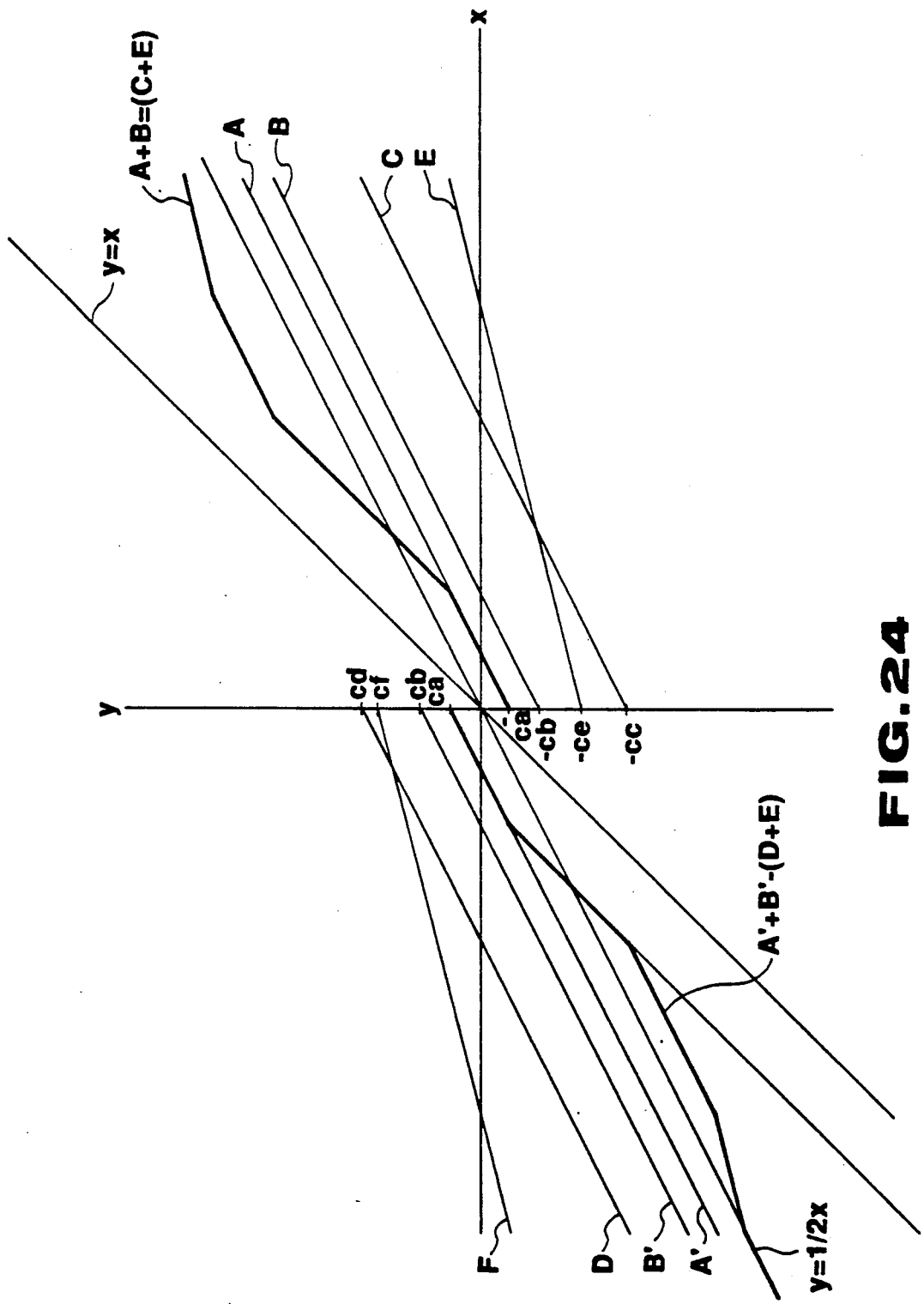
FIG. 24 is a chart showing characteristics of the non-linear operation of the core circuit shown in FIG. 23.

In the above described second core circuit 31, the points of intersection with the Y axis of the characteristic lines A, B, C, D, E and F, which govern the operating characteristics shown in thick solid lines in FIG. 24 may be modified by modifying the control data (ca), (cb), (cc), (cd), (ce) and (cf) applied to second to seventh data input terminals 2 to 217, respectively. As a result, the operating characteristics may be set variably a in the embodiment shown in FIG. 11.

When the CCD type solid state imaging device is used, as in the above described embodiment, eight portions of an object may include high luminosity image signal. Thus, when the output image signal from the solid state imaging device is subjected to the above mentioned contour compensation, the highly luminous portions are enhanced excessively thereby lowering the image quality. For example, cross colors may be produce from a white wave surge on a beach or unnatural black fringes may be produced from sunlight reflecting off the front glass of a car on a bright sunny day.

Figure 25:
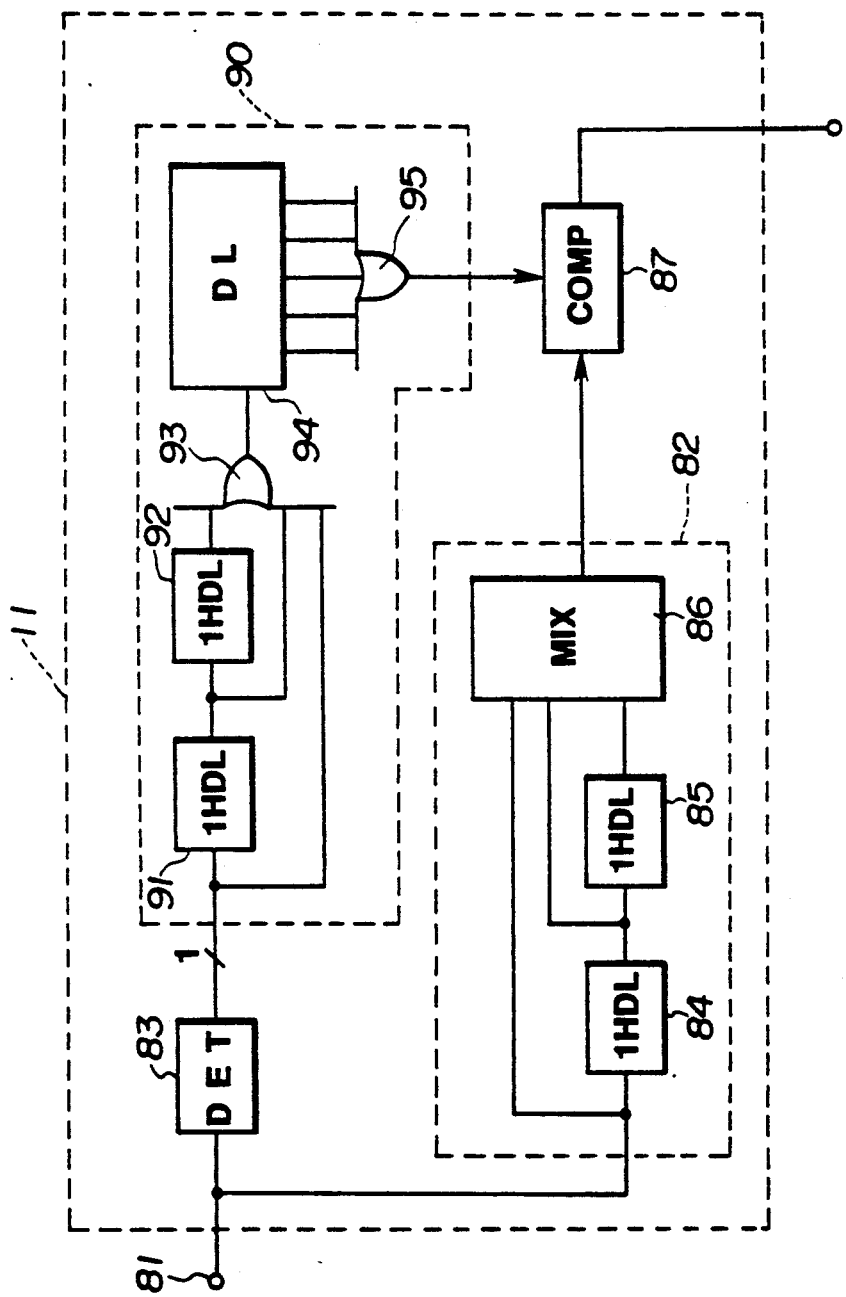
FIG. 25 is a block diagram showing the detail signal generator of the signal processing section of the color television camera shown in FIG. 2 according to another embodiment of the present invention.

FIG. 25 shows an arrangement of a contour compensating signal forming circuit 11 for avoiding the above described deficiency.

In FIG. 25, a digital image signal, such as digital line signal $D_G$, is supplied through an input terminal 81 to a contour compensation signal forming circuit 82 and a detection circuit 83.

Figure 26:
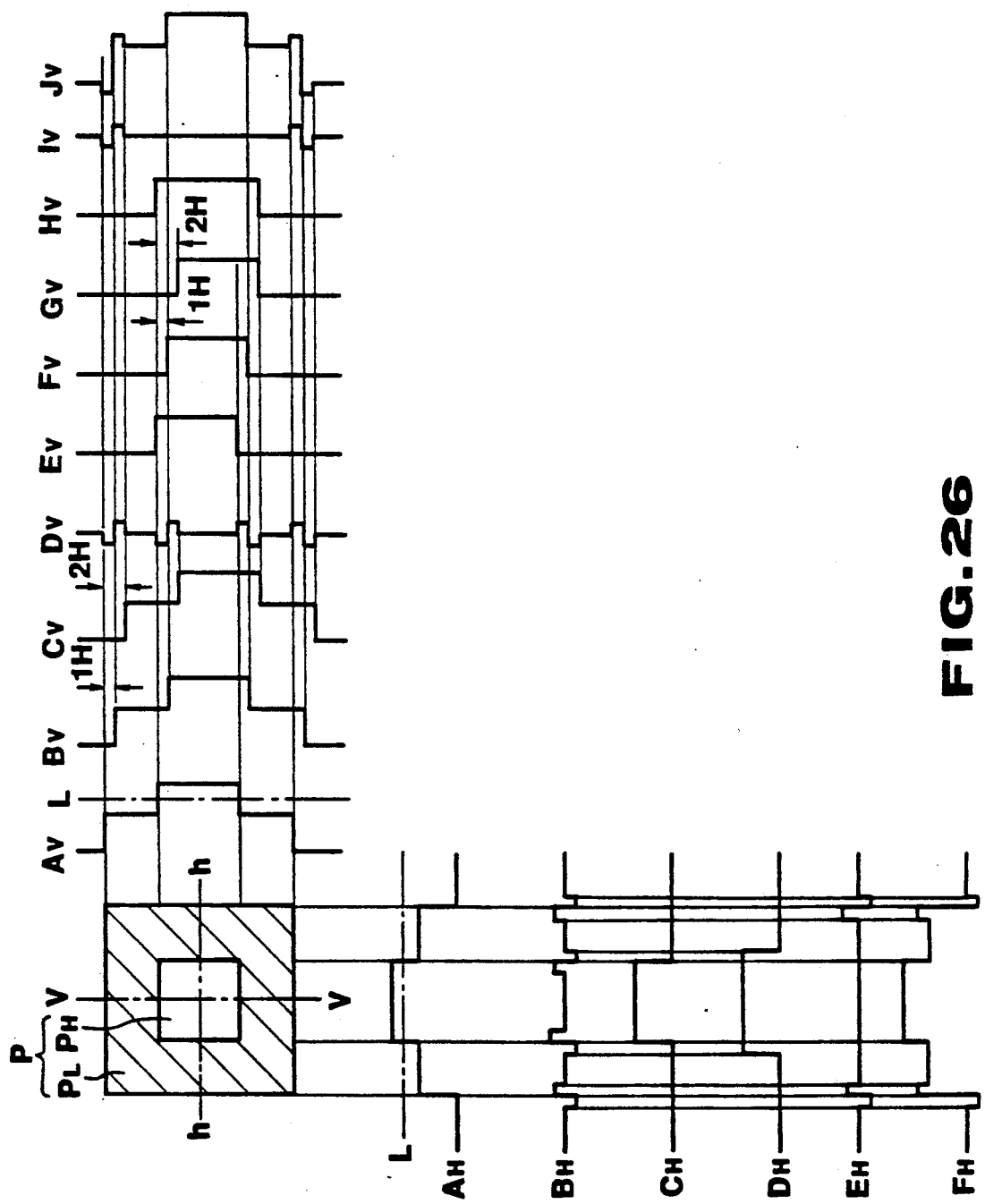
FIG. 26 is a waveform diagram used for explaining the contour compensating operation of the detail signal generator shown in FIG. 25.

The contour compensation circuit 82 includes two IH delay circuits 84 and 85 and a compensation signal forming circuit 86. The image signal from input terminal 81 is delayed by one horizontal period (1H) by 1H delay circuit 84 and is further delayed by another 1H by 1H delay circuit 85. Assume that an object P having a central portion $P_H$ which is more luminous than a peripheral portion $P_L$, as shown in FIG. 26, is detected by a solid-state imaging device With respect to the vertical direction, shown by line v—v, signal Av is the input signal to the 1H delay circuit 84 and signals Bv and Cv, which have the same general waveform as the input signal Av, are supplied from the 1H delay circuits 84 and 85, respectively. These signals Av, Bv and Cv are transmitted to compensation signal forming circuit 86 and processed by an arithmetic operation which may be expressed as follows:

$$Dv = Bv - \frac{1}{2}(Av + Cv)$$

As a result, a vertical contour compensation signal Dv is formed with respect to the signal Bv outputted from the 1H delay circuit 84. The compensation signal forming circuit 86 compares the adjacent data in the input image signal so as to detect the horizontal contour of the image and forms a horizontal contour compensation signal. With respect to the horizontal direction as, for example, shown by line h—h of the object P in FIG. 26, the horizontal contour compensation signal is a signal $B_H$ which represents the contour extracted from the input image signal $A_H$. The contour compensation signal is supplied from contour compensation signal forming circuit 86 to compensation signal suppression circuit 87.

On the other hand, the detection circuit 83, compares the value of the received image signal to a predetermined value and, when the level of a luminosity component of the image signal is higher than the predetermined value, generates a detection signal, for example, a 1-bit signal. Assuming that the level L shown in FIG. 26 is the above mentioned predetermined value or level, then signals $E_V$ and $C_H$ are produced by detection circuit 83. This predetermined value defines the upper limit of the luminosity level for contour compensation in an alternate and possibly simpler method, the maximum value of the luminosity component of the image signal supplied to input terminal 81 may be used as the predetermined value, and an overflow flag outputted from the upstream side A/D converter may be used as the detection signal.

The detection signal from the detection circuit 83 is supplied to a compensation control signal generator 90. This compensation signal generator 90 includes two 1H delay circuits 91 and 92, a first OR circuit 93, a sample delay circuit 94 and a second OR circuit 95. The detection signal from detection circuit 83 is transmitted to 1H delay circuit 91 and thence to 1H delay circuit 92 and, as a result, produces a signal Fv and a signal Gv which are delayed by 1H and 2H, respectively, from the signal Ev from detection circuit 83 as shown in FIG. 26. These signals Ev, Fv and Gv are supplied to OR circuit 93 where an OR operation is preformed so as to generate a signal Hv having a time period longer by 1H in each of both perpendicular directions compared to the time period of signal Fv, as shown in FIG. 26. That is, the time interval indicated by signal Hv is the highly luminous portion of the image signal detected by the detection circuit 83 plus the contour compensation applied to the perpendicular periphery of the high luminous portion. This signal Hv is supplied from OR circuit 93 to sample delay circuit 94 which, in turn, supplies a predetermined number of signals to the OR circuit 95, after a one-sample delay is provided to the output of the OR circuit 93. The number of samples delayed by sample delay circuit 94 corresponds to the contour compensation provided to the horizontal periphery of the high luminous portion of the image signal. Thus, an output signal $D_H$ is the above mentioned detection signal $C_H$ with its portions along both horizontal directions extended by a predetermined number of samples corresponding to the above mentioned contour compensation. That is, the compensation control signal generator 90 generates a signal indicating the high luminous portion of the image signal plus the contour compensated peripheral portion.

The output of the compensation control signal generator 90 is supplied as the compensation control signal to the compensation signal suppression circuit 87. This compensation signal suppression circuit 87 preferably includes a switch circuit which either directly outputs or interrupts the contour compensation signal supplied thereto from the contour compensation signal generator 82 depending on whether the compensation control signal from the compensation control signal generator 90 indicates that the level of the luminosity component of the image signal is lower or higher, respectively, than the predetermined level. In this manner, the contour compensation signal is freed of the contour compensation waveform corresponding to the high luminosity portion of the image signal. This compensation signal suppression circuit 87 may alternately include a multiplication circuit, in which the compensation control signal having a plurality of bits is applied from the compensation control signal generator 90 to the contour compensation signal so as to suppress the contour compensation signal which corresponds to the high luminous portion of the image signal to a desired number of bits.

The output from the compensation signal suppression circuit 87 is supplied to a signal synthesis circuit 14G shown in FIG. 5 so as to be combined with an image signal on the main line with temporal coincidence. Thus, the image signal is a contour compensated signal, such as signal $J_V$ or $F_H$ shown in FIG. 26, in which contour compensation has been made only at a low luminosity component level. This contour compensated signal is then supplied to a succeeding stage of the image signal processing circuit.

Thus, the portion of the contour compensated signal formed in the contour compensation signal generator 82 which is outputted from the solid-state imaging device is suppressed by the compensation control signal from the compensation signal generator 90, as previously described, so that only the low luminosity portion of the image signal is contour compensated. By contour compensating the output analog image signal for the solid imaging device in the present image signal processing circuit as described above, an image having higher quality and proper contour compensation may be produced without excess enhancement of the high luminosity portion of the image signal.

The gamma correction circuits 15R, 15G and 15B respectively perform gamma correction on image enhanced three-color data $D_{R}$, $D_{G}$ and $D_{B}$ supplied from the summation circuits 14R, 14G and 14B and output gamma corrected three-color data $D_{R}$, $D_{G}$ and $D_{B}$.

In this manner, the signal processing section 7 of FIG. 2 outputs image enhanced and gamma corrected 2 fs clock rate three-color data $D_{R}$, $D_{G}$ and $D_{B**}$ which are supplied to color encoder 8 and to digital-/analog (D/A) converters 9R, 9G and 9B, respectively.

The three-color 2 fs rate high-resolution data $D_{R}$, $D_{G}$ and $D_{B**}$, supplied from signal processing section 7, are converted in the D/A converters 9R, 9G and 9B into corresponding three-color output analog signals $R_{OUT}$, $G_{OUT}$ and $B_{OUT}$, which are outputted at signal output terminals 10R, 10G and 10B, respectively.

Figure 27:
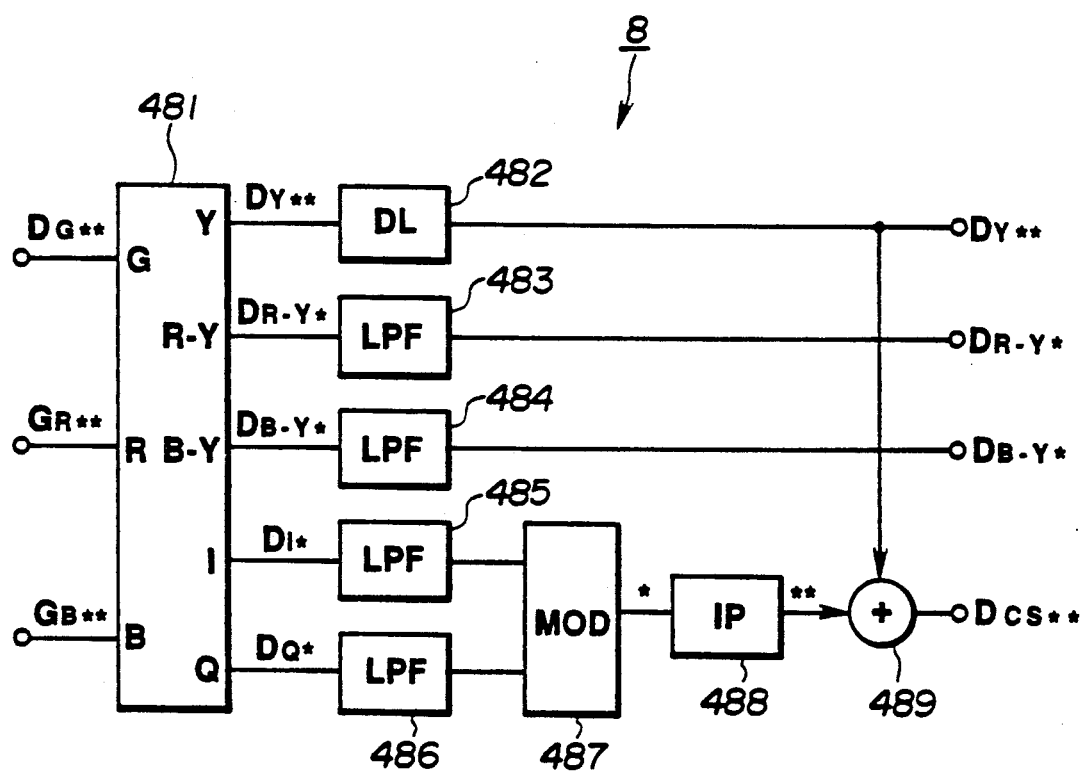
FIG. 27 is a block diagram of a color encoder of the color television camera shown in FIG. 2.

Referring to FIG. 27, the color encoder 8 includes a matrix circuit 481, supplied with the 2 fs clock rate three color data $D_{R}$, $D_{G}$ and $D_{B}$ from the signal processing section 7, a delay circuit 482 supplied with luminosity signal data $D_{Y}$ generated by the matrix circuit 481, low-pass filters 483, 484, 485 and 486 respectively supplied with color difference signal data $D_{R-Y*}$, $D_{B-Y*}$, $D_{I*}$ and $D_{Q*}$ formed by matrix circuit 481, a modulation circuit 487 respectively supplied via low-pass filters 485 and 486 with $D_I^*$ and $D_Q^*$ formed by matrix circuit 481, an interpolator 488 supplied with modulated data from modulation circuit 487 and a summation circuit 489 supplied with interpolated data from interpolator 488 and also supplied via delay circuit 482 with luminosity signal data $D_{Y^{**}}$ formed in matrix circuit 481.

The matrix circuit 481 performs a matrix operation on the 2 fs clock rate three-color data $D_{R^{}}$, $D_{G^{}}$ and $D_{B^{}}$ to form fs clock rate luminosity signal data $D_{Y^{}}$ and fs clock rate color difference signal data $D_{R-Y^*}$, $D_{B-Y^*}$, $D_{I^*}$ and $D_{Q^*}$.

The color encoder 8 outputs the luminosity signal data $D_{Y^{}}$ from matrix circuit 481 via delay circuit 482, as component color image data on the three-color data $D_{R^{}}$, $D_{G^{}}$ and $D_{B^{}}$, and the color difference signal data $D_{R-Y^*}$, and $D_{B-Y^*}$ from matrix circuit 481 via low-pass filters 483 and 484, respectively. The delay circuit 482 provides delay characteristics to the luminosity signal data $D_{Y^{**}}$ which correspond to the processing time associated with low-pass filters 483 and 484.

The modulation circuit 487 of the color encoder 8 performs a two-phase d.c. modulation operation on the signals $D_{I^*}$ and $D_{Q^*}$ supplied from matrix circuit 481 via low-pass filters 485 and 486, respectively. The modulated output data from the modulation circuit 487 corresponds to a modulated color difference signal containing an odd-number order of harmonics of the color subcarrier frequency fsc.

The interpolator 488 performs a digital filtering operation of extracting fsc and 7 fsc components from the modulated output data from modulation circuit 487 so as to form modulated color difference signal data having a clock rate of 2 fs which, in turn, is equal to 8 fsc.

The color encoder 8 sums the luminosity signal data $D_{Y^{}}$ supplied from matrix circuit 481 via delay circuit 482 to the 2 fs clock rate modulated color difference signal data formed in the interpolator 488, so as to form a digital composite video signal $D_{CS^{}}$.

Thus, the color encoder 8 is supplied with image enhanced and gamma corrected 2 fs clock rate three-color data $D_{R^{}}$, $D_{G^{}}$ and $D_{B^{}}$ from signal processing section 7, and outputs component color video data composed of the 2 fs rate high resolution luminosity signal data $D_{Y^{}}$ and the fs rate color difference signal data $D_{R-Y^*}$ and $D_{B-Y^*}$, and also outputs the 2 fs rate high resolution digital composite video signal $D_{CS^{**}}$.

The component color image data from color encoder 8, that is, the luminosity signal data $D_{Y^{**}}$ and the color difference converters 9Y, 9R-Y and 9B-Y, respectively.

The luminosity signal data $D_{Y^{**}}$ and the color difference signal data $D_{R-Y^*}$ and $D_{B-Y^*}$ are respectively converted by D/A converters 9Y, 9R-Y and 9B-Y into analog component color video signals $Y_{OUT}$, R-$Y_{OUT}$ and B-$Y_{OUT}$, and are then supplied to signal output terminals 10Y, 10R-Y and 10B-Y.

The digital composite video signal $D_{CS^{}}$ from color encoder 8 is supplied to digital/analog (D/A) converter 9CS, whereupon the 2 fs rate high resolution digital composite video signal $D_{CS^{}}$ is converted into an analog composite video signal $CS_{OUT}$ and supplied to a signal output terminal 10CS.

Thus, when the above described signal processing circuit is used with a solid-state imaging apparatus, the imaging output signals read from the solid-state image sensors of the imaging section are digitized by A/D converters at a clock rate equal to the sampling rate fs so as to form digital output signals which are interpolated to form 2 fs rate signals. Further, 2 fs rate broad range horizontal detail signals are formed by detail signal generating means and summed to the 2 fs rate signal so as to obtain 2 fs rate high resolution image enhancement signals.

Although a preferred embodiment of the present invention and various modifications have been described in detail herein, it is to be understood that this invention is not limited to the specifically described embodiment and modifications and that other modifications and variations may be effected therein by one skilled in the art without departing from the spirit and scope of the invention as defined by the appended claims.

I claim:

1. A signal processing apparatus for a solid-state color video camera having first, second and third solid-state image sensors for red-color, green-color and blue-color images, respectively, having equal pixel pitches, said solid state image sensor for the green-color image being arrayed with a spatial shaft of one half the pixel pitch with respect to said solid-state image sensors for the red-color and the blue-color images, said signal processing apparatus comprising:

means for deriving output signals from said first, second and third image sensors in accordance with said red-color, green-color and blue-color images, respectively;

analog-to-digital converting means for digitizing said output signals derived from said first, second and third solid-state image sensors at a predetermined sampling rate and thereby providing digitized red, green and blue signals;

first delay means having at least one digital delay circuit with a delay time of a horizontal period and supplied with the digitized green signal, said first delay means generating a plurality of relatively delayed output signals;

second delay means having at least one digital delay circuit with a delay time of said horizontal period and supplied with at least one of said digitized red and blue signals, said second delay means generating a plurality of relatively delayed output signals;

first synthesizing means for synthesizing said plurality of output signals from said first delay means so as to provide an output from said first synthesizing means having a limited bandwidth in the vertical direction;

second synthesizing means for synthesizing said plurality of output signals from said second delay means so as to provide an output from said second synthesizing means having a limited bandwidth in the vertical direction;

summation means for equally adding the outputs of said first and second synthesizing means so as to provide a summed output; and digital filter means supplied with the summed output of said summation means for generating a horizontal detail signal therefrom.

2. The signal processing apparatus according to claim 1; wherein said digital filter means is adapted for generating a horizontal detail signal at a rate twice the sampling rate; and further comprising interpolating means for interpolating said digitized signals from said analog-to-digital converting means at said rate twice the sampling rate, and adding means for adding an output signal of said digital filter means to an output signal of said interpolating means.

3. The signal processing apparatus according to claim 2; further comprising gamma correction means for performing gamma correction of an output signal of said adding means.

4. The signal processing apparatus according to claim 2, further comprising first gamma correction means operating at said sampling rate for performing gamma correction of said digitized signals from said analog-to-digital converting means and second gamma correction means operating at said rate twice the sampling rate for performing gamma correction of at least said horizontal detail signal.

5. The signal processing apparatus according to claim 2; wherein said interpolating means includes second digital filter means having filtering characteristics with an even or odd number of zero points, and the first mentioned digital filter means for generating the horizontal detail signal also has filtering characteristics with a number of zero points which is either even or odd, respectively.

6. The signal processing apparatus according to claim 1; further comprising non-linear operation means for receiving at least said horizontal detail signal from said digital filter means and having compression characteristics which compress said at least said horizontal detail signal, wherein said compression characteristics may be independently. set on positive and negative sides of predetermined levels.

7. The signal processing apparatus according to claim 6; wherein said non-linear operating means has characteristics which clip said at least said horizontal detail signal when said at least said horizontal detail signal lies in a range between selected ones of said predetermined levels.

8. A signal processing apparatus for a solid-state video imaging device having first, second and third solid-state image sensors for red-color, green-color and blue-color images, respectively, having equal pixel pitches, said solid state image sensor for the green-color image being arrayed with a spatial shift of one half the pixel pitch with respect to said solid-state image sensors for the red-color and the blue-color images, said signal processing apparatus comprising:

means for deriving output signals from said first, second and third image sensors in accordance with said red-color, green-color and blue-color images, respectively;

analog-to-digital converting means for digitizing said output signals derived from said first, second and third solid-state image sensor at a predetermined sampling rate and thereby providing digitized red, green and blue signals;

perpendicular detail signal generating means including a digital delay circuit having a delay time of approximately a horizontal scanning period and adapted for generating a perpendicular detail signal from at least one of said digitized red, green and blue signals from said analog-to-digital converting means;

summation means for summing equal amounts of the digitized green-color signal and the digitized red-color signal, the digitized blue-color signal or a combined signal including the digitized red and blue signals so as to provide a summed output signal;

digital low-pass filter means for receiving said perpendicular detail signal from said perpendicular detail signal generating means; and digital filter means for receiving said output signal of said summation means and having characteristics of passing at least a predetermined band of said output signal of said summation means, said summation means, said perpendicular detail signal generating means and said digital low-pass filter means operating at said predetermined sampling rate and said digital filter means operating at a processing rate twice the sampling rate.

9. The signal processing apparatus according to claim 8; wherein said digital filter means includes a filter having filter characteristics with at least two even-numbered zero points located at said sampling rate.

10. The signal processing apparatus according to claim 8; wherein said digital filter means includes a low-pass filter having filter characteristics with at least two zero points located near a color subcarrier frequency of an associated composite color video signal.

11. The signal processing apparatus according to claim 8; wherein said digital filter means includes a low-pass filter having filter characteristics with a negative response located near a color subcarrier frequency of an associated composite color image signal.

12. The signal processing apparatus according to claim 9; further comprising:

detection means for producing a detection signal when a level of said at least one of said digitized red, green and blue signals from said analog-to-digital converting means exceeds a predetermined level, compensation control signal generating means for receiving said detection signal and for generating a compensation control signal indicating a predetermined period, and suppressing means for suppressing said perpendicular detail signal during said predetermined period indicated by said compensation control signal.

* * * * *